March 19, 1957

F. J. FURMAN ET AL 2,785,800

RECORD SORTING MECHANISM

Filed Feb. 21, 1952

INVENTORS
F.J. FURMAN  H.J. KISTNER
H.L. READ
BY
*J. W. Lowritzer*
ATTORNEY

March 19, 1957 F. J. FURMAN ET AL 2,785,800
RECORD SORTING MECHANISM
Filed Feb. 21, 1952 15 Sheets-Sheet 4

INVENTORS
F.J.FURMAN H.J.KISTNER
H.L.READ
BY
ATTORNEY

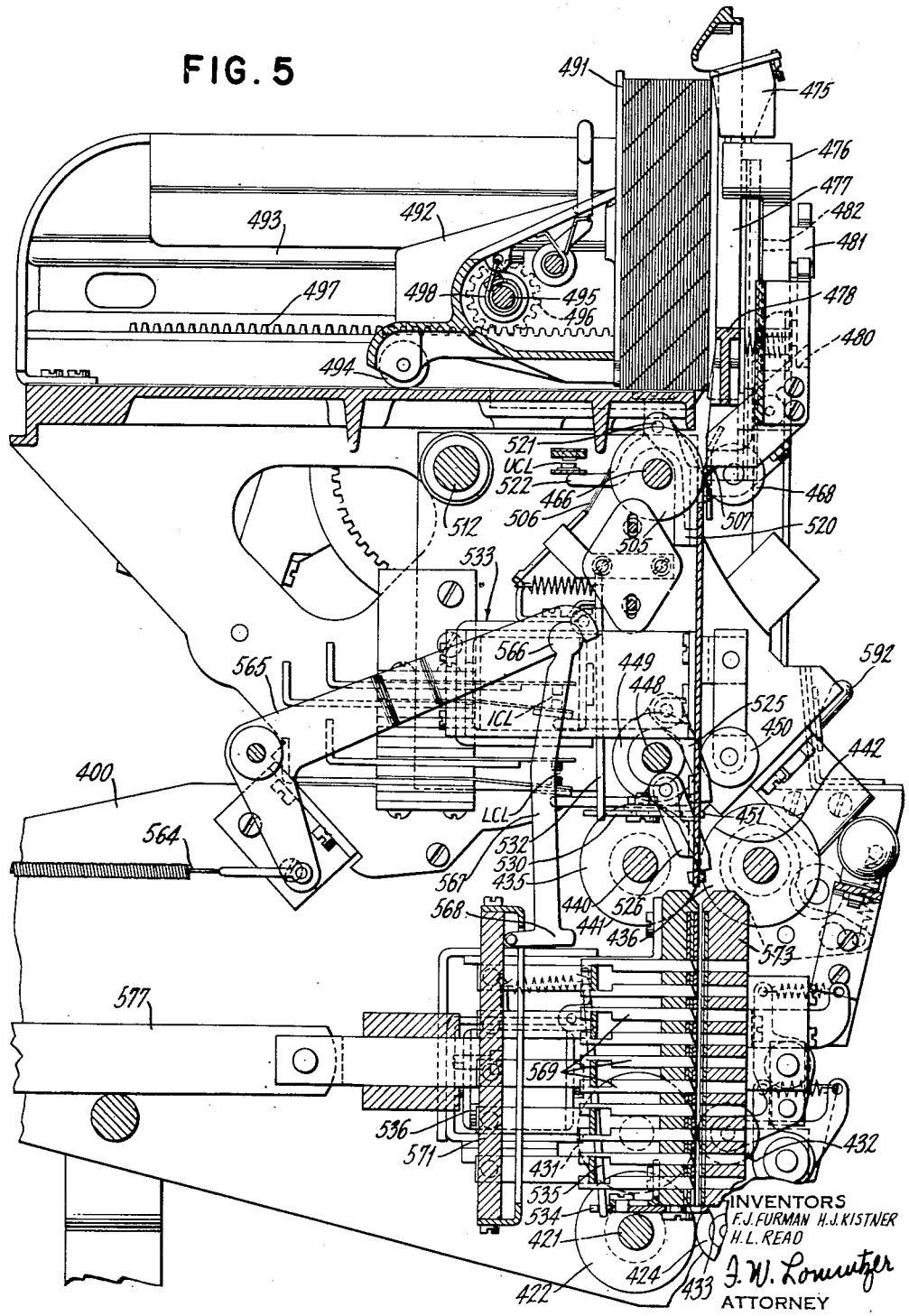

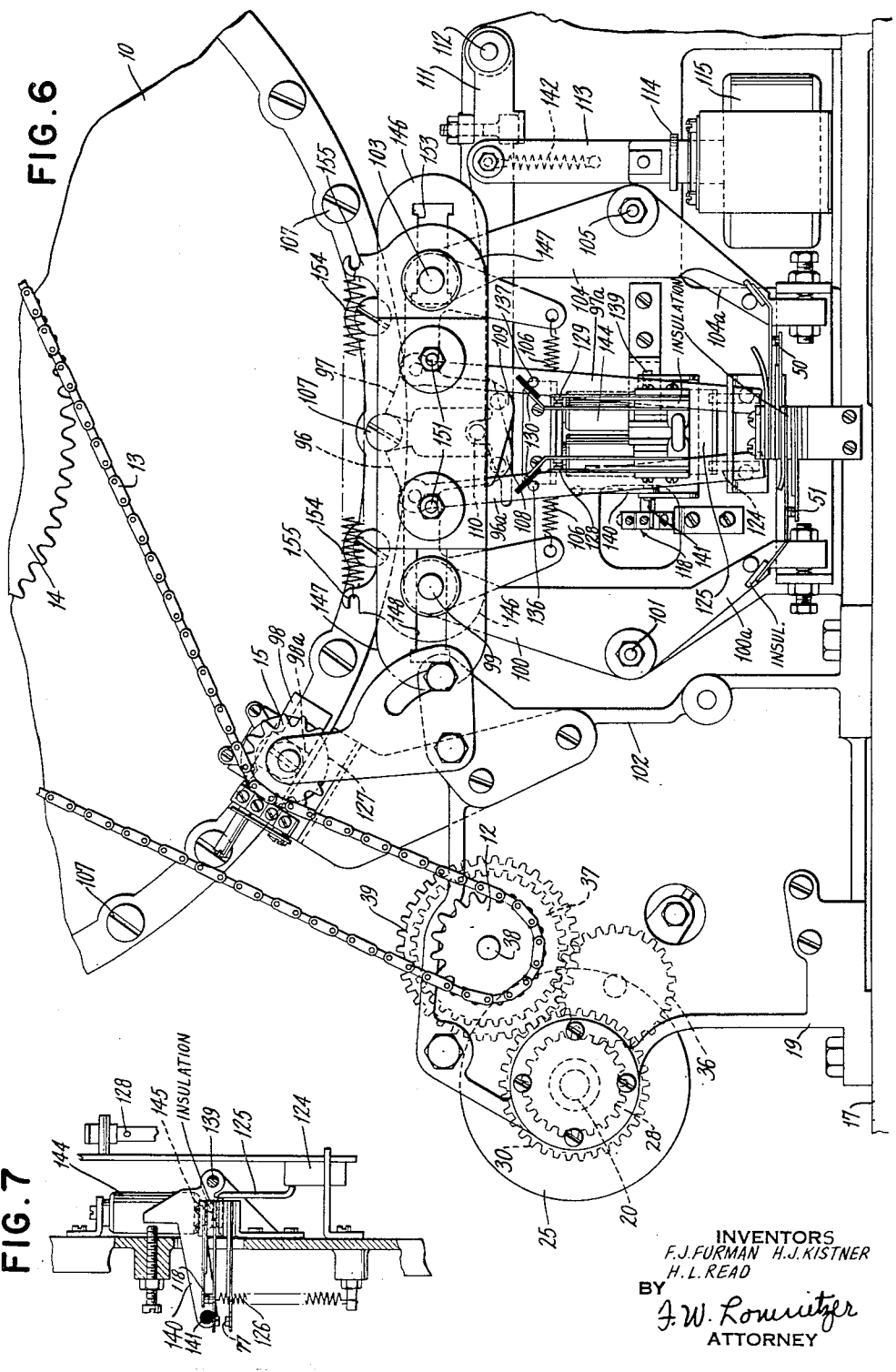

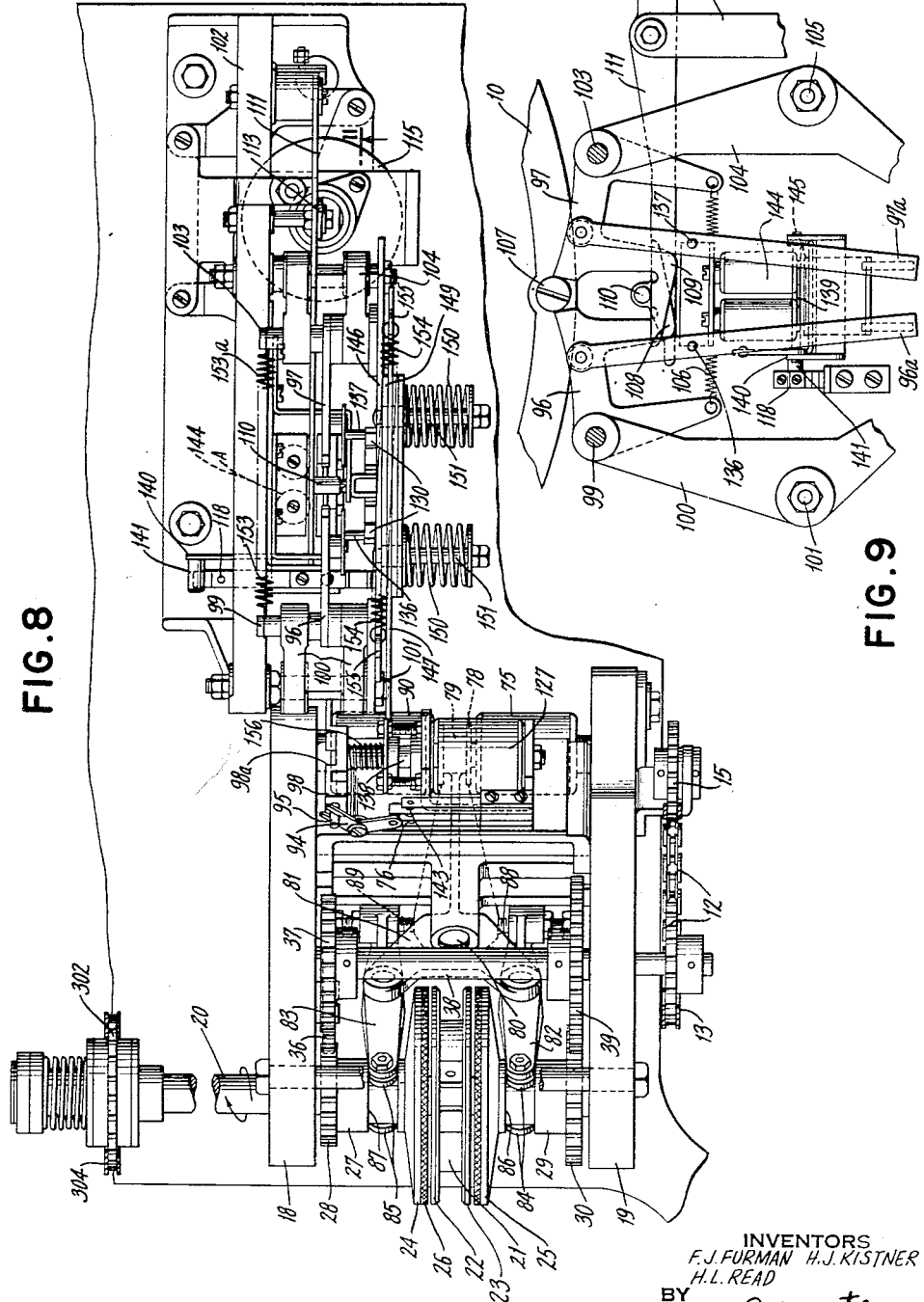

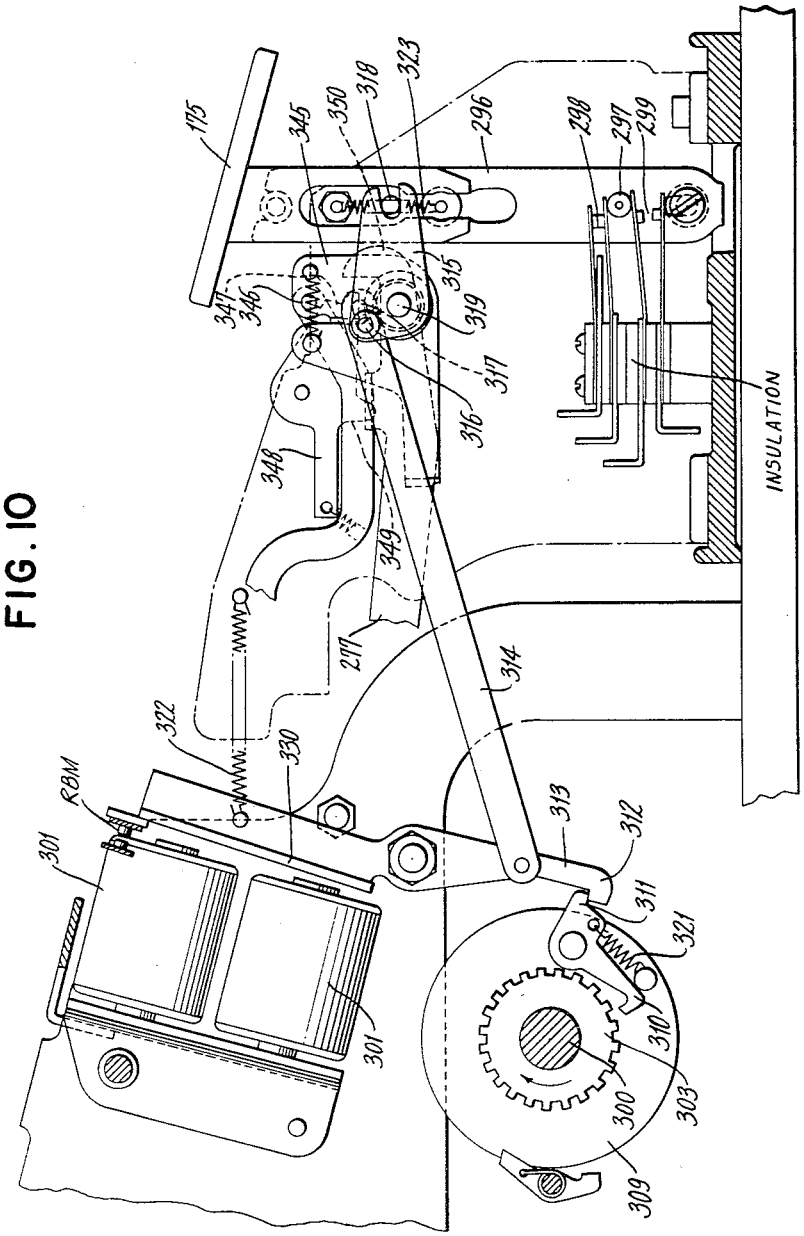

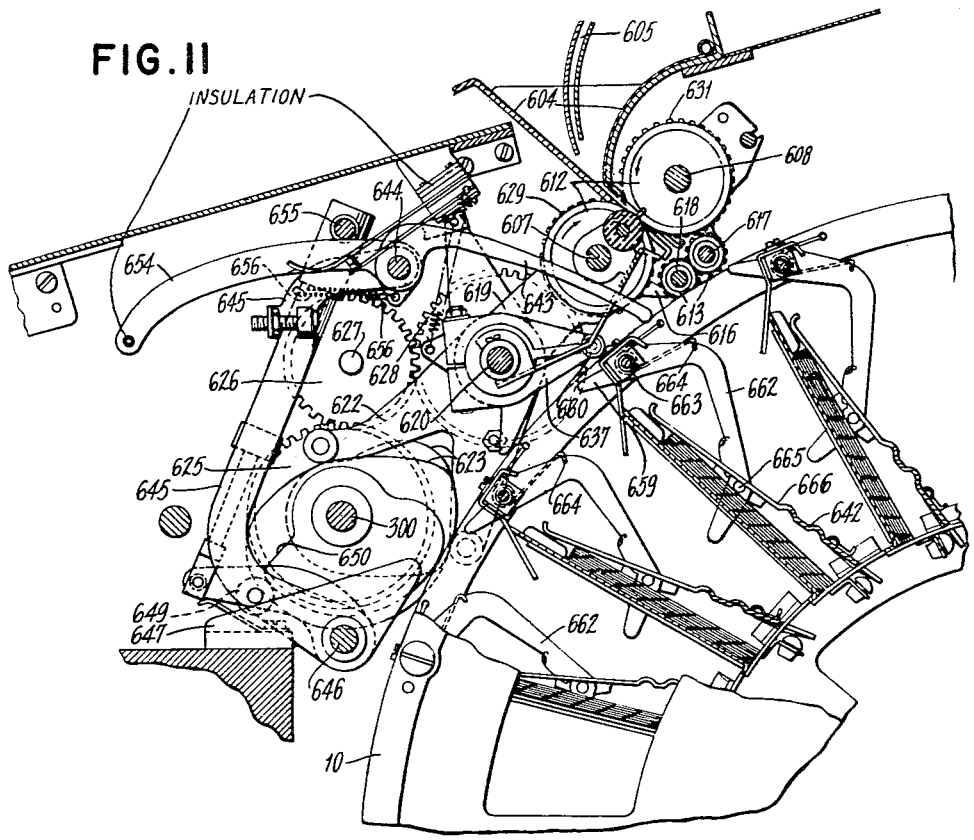

March 19, 1957 F. J. FURMAN ET AL 2,785,800
RECORD SORTING MECHANISM

Filed Feb. 21, 1952 15 Sheets-Sheet 10

INVENTORS
F.J. FURMAN H.J. KISTNER
H.L. READ
BY
*F. W. Lomnitzer*
ATTORNEY

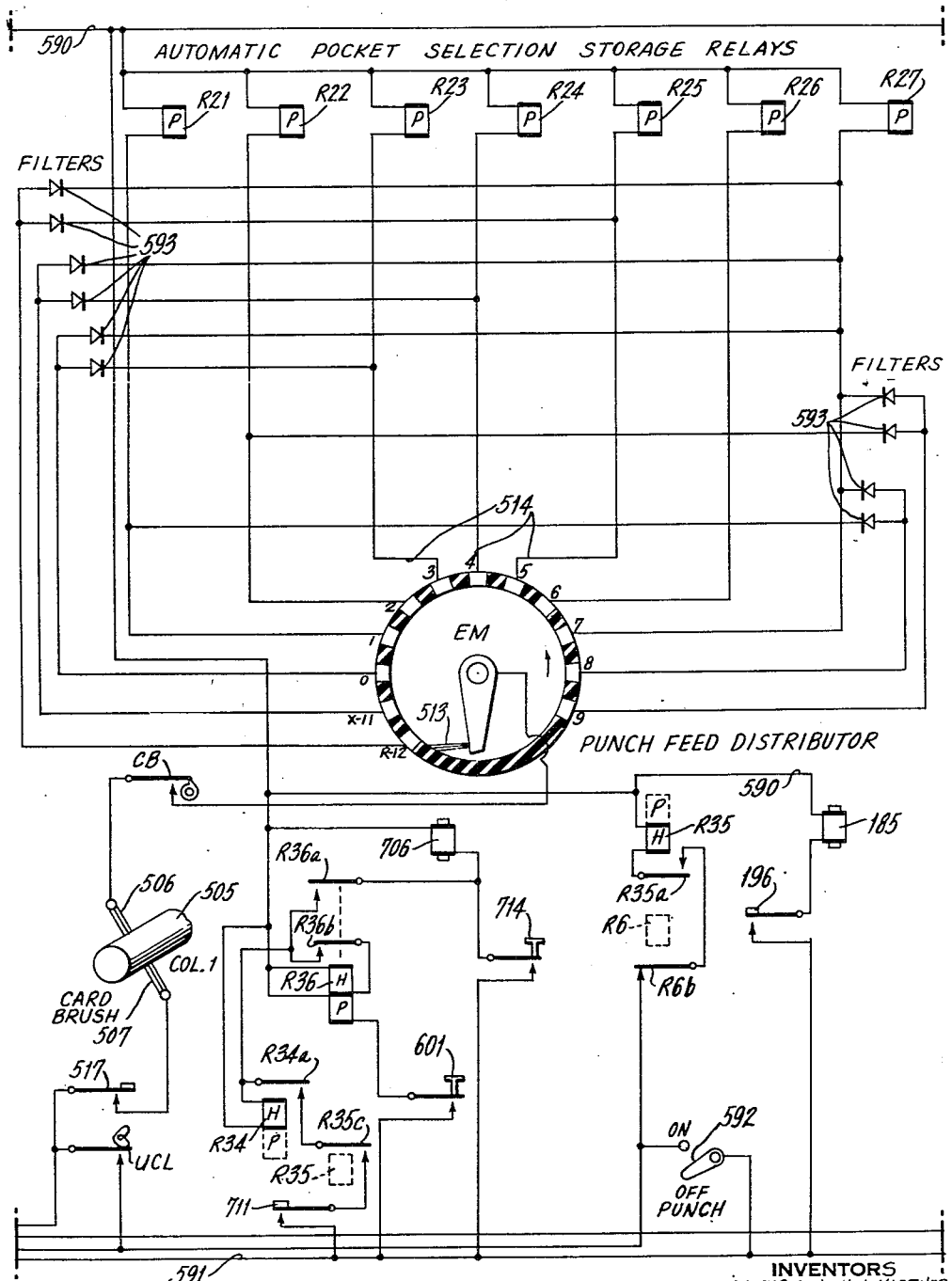

March 19, 1957   F. J. FURMAN ET AL   2,785,800
RECORD SORTING MECHANISM

Filed Feb. 21, 1952   15 Sheets-Sheet 14

INVENTORS
F.J. FURMAN  H.J. KISTNER
H.L. READ
BY
ATTORNEY

United States Patent Office 2,785,800
Patented Mar. 19, 1957

2,785,800

RECORD SORTING MECHANISM

Frank J. Furman and Harold J. Kistner, Endicott, and Harold L. Read, Vestal, N. Y., assignors to International Business Machines Corporation, New York, N. Y., a corporation of New York Application February 21, 1952, Serial No. 272,822

11 Claims. (Cl. 209—110)

This invention relates to apparatus for sorting statistical records such as perforated cards.

It is an object of the invention to supervise the selection of sorting compartments in such manner that apart from sorting records into a series of compartments in the normal manner all records bearing a certain designation are directed to a succession of compartments, and each in succession as the preceding compartment is filled up.

It has been proposed in the U. S. patent to C. Campbell, No. 2,000,214, patented May 7, 1935, to provide in a perforated card controlled sorter of the "chute blade type" an arrangement that enables all cards to be directed to a succession of compartments as the preceding one is filled up, but it does not disclose a supervisory arrangement which is under control of the records per se and capable of accomplishing the following objects of the present invention.

It is an object of the invention to devise a sorting mechanism wherein cards having a plurality of different designations are sorted into a plurality of sorting compartments and to provide a supervisory mechanism for said sorting mechanism whereby upon the occurrence of a certain other designation all other cards bearing this other designation are directed to a succession of compartments and to the next one as the preceding compartment is filled up.

A further object of the invention relates to the card sorting control mechanism which enables cards bearing a certain designation to be the instrumentalities for directing such cards to sorting compartments successively, that is to say, when one sorting compartment is filled the adjacent empty compartment is then selected to receive cards having the same one designation. This requirement is due to the fact that cards bearing a certain designation appear in the majority and a single compartment would have insufficient capacity to receive them without requiring the operator to repeatedly empty the compartment.

A still further object of the invention is to devise a supervisory arrangement for said sorting mechanism which is under control of the sensing means for the records so that upon the occurrence of cards or records having said other designation the sensing means will select the supervisory mechanism so that they will be sorted or directed into one of a series of compartments, the particular one depending upon the preceding one or ones filled up.

A still further object of the invention is to provide a sensing mechanism which is common to a plurality of compartments and is operative in each cycle to sense the number of records in each compartment, and upon detection of a filled-up condition of one compartment to cause the supervisory mechanism for the compartment selector to function in such manner that further records are directed to the next sorting compartment until the latter is filled up.

Another object of the invention is to provide signals to indicate to the operator when a filled-up condition is observed, said signal designating when any one of the series of compartments which receive sorted records is filled up, and also when the last of a series of compartments utilized in succession is filled up.

A further object of the invention is to devise such signal in the form of one visible by the operator and in another form to render the motor release bar inoperative to prevent further cyclic operations of the machine.

While the present improvements are preferably incorporated in a sorting machine of the "sorting drum" type, by means of which a plurality of sorting compartments carried by the drum are brought to a common record receiving position, and such sorting compartments are herein selected under control of a perforated record, the invention is not limited to such an arrangement. The records may be sorted into compartments by a chute blade sorting mechanism, and as is well known the compartments may be selected by keys instead of by perforations on the records. So also, the invention is not limited to any specific construction and equivalents may be used to accomplish the desired functions.

Other objects of the invention will be pointed out in the following description and claims and illustrated in the accompanying drawings, which disclose, by way of example, the principle of the invention and the best mode, which has been contemplated, of applying that principle.

In the drawings:

Fig. 1 is a view in side elevation of a well known commercial form of combined check sorting and accounting machine shown in the patent to F. L. Fuller et al., No. 2,142,352, in which the present improvements for sorting cards are preferably incorporated.

Fig. 5 is an irregular sectional view taken in the line 5—5 of Fig. 4.

Fig. 6 is a view in side elevation of parts arranged at the bottom of the machine and shows particularly the stopping devices for the sorting drum.

Fig. 7 is a detail view of certain contact controlling devices associated with the drum stopping devices.

Fig. 8 is a plan view of some of the parts shown in Fig. 6.

Fig. 9 is a detail view of certain parts of the sorting drum stopping devices.

Fig. 10 is a view which shows primarily the motor release bar and associated electro-magnetic clutch.

Fig. 11 is a sectional view showing a few of the sorting compartments and their association with the feed chute of the card punching mechanism.

Fig. 12 is a view showing some of the parts of Fig. 11, but in operated position.

Figure 15A:
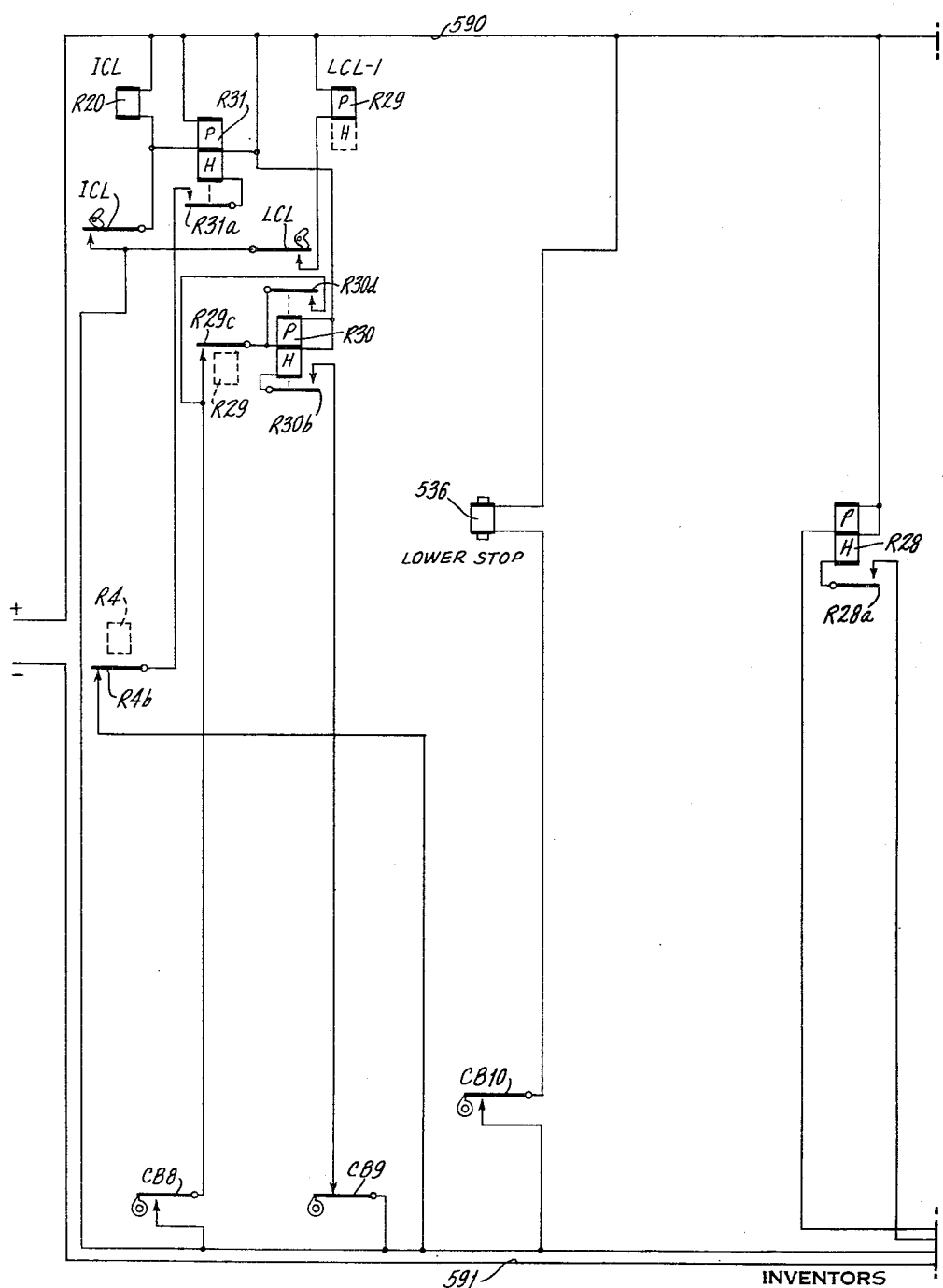

Figs. 15a, b, c and d, when assembled in the named order constitute a wiring diagram.

*General description and operation of the machine*

The present improvements are preferably incorporated in the basic machine shown in the patent to F. L. Fuller et al., No. 2,142,352.

While not restricted to the particular use for which the present improvements have been designed, the principal use of the present improvements is to sort postal money orders in the form of punched cards. The first card column is pre-punched to receive a hole in one of twelve index point positions to represent the number of the "Federal Reserve Bank District." It should be understood that there are 12 regional post offices which conform generally to the 12 Federal Reserve Bank Districts and each of the twelve Federal Reserve Bank Districts is represented on each card by the digital punching in the 1 through 12 index point positions in card column No. 1.

After payment at banks or post offices the postal money order cards are then cleared and processed at the Federal Reserve Bank by the present machine. A group of cashed money order cards is placed in the hopper or magazine of the present machine and upon depression of the motor release bar to cycle the machine each is automatically fed to a viewing station. During this time the "District Number" designation or hole which was prepunched in the postal money order card is sensed and stored up by relays until such time that it is read out to control the predetermined extent of rotation of a sorting drum to select a pocket determined by the Federal Reserve District number designation.

With the card in the viewing station the amount written on the card is read by the operator and set up under control of the ten-key keyboard mechanism of the basic machine. For the first card fed from the magazine a depression of the motor release bar causes a single cycle of the operation of the machine and the rotation of the sorting drum at the termination of the cycle, but thereafter a depression of the motor release bar following the ten-key keyboard operation causes the machine to take two cycles, and the position of the drum is not changed until after the second cycle. During the first of the two cycles the card which was at the viewing station is fed to the punching station where it is stopped.

After the card punching has been completed the card stop located in the card punching mechanism is released and the card then advances to the check receiving chute of the basic machine. The presence of a card in the punching mechanism causes means to be responsive to continue with another cycle which automatically feeds the card through the receiving chute and by feed rollers in the basic machine to the selected compartment.

Coming now to the present improvements, in view of the fact that each machine is allocated to process postal money orders having the same district number designation as the Federal Reserve District in which the machine is physically located, there will be a majority of correspondingly designated "local" punched money order cards. If only one sorting compartment was allocated for receiving such local postal money orders it is obvious that the operator would be required to empty this single sorting compartment many times during a normal day's operation. Therefore, while one sorting compartment is allocated for each of the "foreign" Federal Reserve Districts, which will provide ample sorting capacity for such foreign money orders, the present machine provides ten sorting compartments for local cards. These sorting compartments are filled in succession as the preceding sorting compartment is completely filled. Responsive to the filling of each compartment the next unfilled sorting compartment will be automatically selected to receive local money orders without any attention by the operator until the tenth local card sorting compartment is completely filled. This filling up is designated to the operator in the same manner that the sorting compartments allocated for foreign Federal Reserve Districts are indicated as filled. The indication that the tenth local card sorting compartment is filled requires that the local money order sorting compartments be emptied by the operator.

In the present description it is assumed that the local district designation is the second Federal Reserve District which necessitates for sorting compartment selection purposes a card hole at the 2 index point position. However, in the present machine instead of selecting the No. 2 sorting compartment, sorting compartments 13–22, inclusive are selected in succession by the 2 hole. Because of the careless handling of money orders beyond the control of Post Office Departments, it is assumed that a certain number will be found to be so mutilated and torn that they cannot be properly punched and passed through the machine. Accordingly, such postal money order cards are sorted on a manual basis and manually placed in a sorting compartment selected by the depression of a selector key on the compartment selector keyboard of the basic machine. Assuming it is the No. 2 key, sorting compartment No. 2 will be brought into position and the operator may place the mutilated card at the side of the machine into the compartment which is now in position for endwise insertion of the punched card. For these cards, duplicate cards may be punched by conventional key-operated card punches.

In this connection sometimes the mutilated cards are in such condition that they cannot be punched but can, nevertheless, be manually placed in the regular card receiving chute and fed into the No. 2 compartment, as explained above. This will take care of cards which are in this condition. Of course, such mutilated cards would not be punched but this can also be taken care of by punching in a conventional key controlled card punching machine but, if impossible, a duplicate 51-column card may be punched and this used as a substitute for the original postal money card for the subsequent processing through record controlled accounting and listing machines.

Card feed and sensing unit

The card feed, card punch and sensing unit is arranged above a combined check sorting and accounting machine of the type shown in the patent to F. L. Fuller et al., No. 2,142,352, issued January 3, 1939, and is so arranged that cards are sensed to select a compartment, then fed to be punched by a punching mechanism and subsequently fed into the check receiving chute of the basic machine to be sorted into sorting compartments selected by the prepunched holes in the cards.

Driving mechanism and continually rotated feed rollers

By means to be subsequently described a shaft 306 (Fig. 1) of the basic machine is continually rotated, and said shaft carries a pulley having a belt drive connection 416 (Fig. 1) to a pulley 417 secured to a shaft 418. To said shaft there is secured a gear 419 (Figs. 2 and 4) meshing with a gear 420 secured to a roller drive shaft 421. Drive shaft 421 carries feed rollers 422 (Fig. 4) and is mainly supported by side plates 400, 401, and, an extension thereof by a bracket 423 (Figs. 2 and 4) carried by side plate 401. Spring-pressed against these rollers are cooperating rollers 424. The two sets of card ejecting rollers 422—424 (Figs. 4 and 5) are at the bottom of the punching mechanism. Attached to the end of drive shaft 421 adjacent side frame plate 400 is a gear 428 (Figs. 3 and 4) driving through an idler gear 428a, a gear 429 secured to a roller drive shaft 430 carrying rollers 431 cooperating with spring-pressed rollers 432. The sets of rollers 431—432 are also continually driven and are of the "slip type" and urge a card in the punching mechanism against a card stop or gate 433 (Fig. 5).

There is also a set of rollers 441—442 disposed above the punching mechanism and are continually rotated as follows: A gear 437 (Fig. 4) secured to drive shaft 421 drives a gear 438 through an intermediate gear 439. Said gear 438 is attached to a roller drive shaft 440 carrying feed rollers 441 against which are spring-pressed cooperating rollers 442.

Gear 438 (Fig. 2) drives through an intermediate idler pinion 447 a gear 446 secured to a roller drive shaft 448. Said drive shaft 448 carries feed rollers 449 (Figs. 3 and 5) against which are spring-pressed cooperating rollers 450. Rollers 449—450 are continually rotated and are of the slip type and urge a card fed from the magazine to a viewing station against a card stop or gate 451 (Fig. 5) to hold it there while it is being examined by the operator. When gate 451 releases a card in the viewing station rollers 449—450, 441—442 and 431—432 feed said card to the punching mechanism and against gate 433.

Card feed clutch

The card feed clutch connects the operating means for the card pickers and the first set of feed rollers to feed a card from the magazine to the viewing station. It is of the usual electromagnetic type, well known in the art.

Shaft 440 has attached thereto a gear 443 (Figs. 2 and 4) which, through an intermediate idler pinion 444 drives a gear 445. Gear 445 has a sleeve connection to a ratchet wheel 455 loose on stub shaft 456 on which is loosely mounted a disk 457 carrying by a pivot stud 458 (Fig. 2) on said disk 457 a pawl 459. Said pawl is normally held from engaging ratchet wheel 455 by the armature 460 of a card feed clutch magnet 461. When the latter is energized a clutch engagement for a full revolution of disk 457 is effected. Attached to disk 457 is a gear 462 which drives through an idler gear 463 a gear 465, attached to a roller drive shaft 466. Said roller drive shaft carries feed rollers 467 (Fig. 3) against which are pressed feed rollers 468. Rollers 467, 468 are the card magazine feed rollers.

Card picker

The card pickers 475 (Fig. 4) are adapted to feed the cards singly from the magazine to the viewing station and are carried by a webbed frame 476, said pickers being slidably mounted in slots 477 formed in the front plate 478 of the card magazine. Pivotally mounted on a stud 479 carried by front plate 478 is a double arm 480 which is bifurcated at its free end to receive a block 481 pivoted on a pin 482 carried by webbed frame 476. The right end (Fig. 3) of said double arm 480 has a link connection 483 to a pivoted follower arm 484 urged by a spring 485 to bear against a profile cam 486 pivoted on a stud shaft 487. Attached to said cam 486 is a gear 488 meshing with an idler gear 489 which in turn meshes with a gear 490 secured to the end of the drive shaft 466. When the aforesaid one-revolution clutch is engaged shaft 466 is driven two revolutions which through the reduction gear drive described rotates cam 486 one revolution to thus reciprocate card pickers 475. The latter move the foremost card to the now rotating feed rollers 467–468 which feed the card to the now rotating feed rollers 449—450. The latter urge the card against the gate 451, holding the card in the viewing station so that written numerical data can be read by the operator.

Card magazine

The card magazine (Figs. 2 and 5) is of sufficient capacity to hold about 675 cards of 51-card-column width. The cards are inserted so that they are fed downward with the "9" index point leading to have the written data on the face thereof visible at the viewing station. The edges of the cards are placed to rest upon a base plate which has suitable side plates to provide an open top magazine. A follower plate 491 (Fig. 5) is urged by means now to be described to automatically move the stack of cards forwardly.

A casting 492 is apertured so as to receive a fixed guide rod 493 and said casting also carries rollers 494 traveling over the base plate of the card magazine to enable said casting 492 to be urged to the right and therefore the follower plate 491 affixed to said casting. The casting 492 also carries a shaft 495 having affixed thereto pinions 496 adapted to roll over a related rack 497. A coil spring 498, which is similar to a clock spring, surrounds and is secured at one end to shaft 495 and is wound up as the casting 492 is moved rearwardly, or to the left and as it unwinds causes follower plate 491 to be moved to the right, compressing the stack of records and urging the foremost card against the card pickers 475 so that it may be fed singly from the magazine.

Card analyzing means

Figure 4:
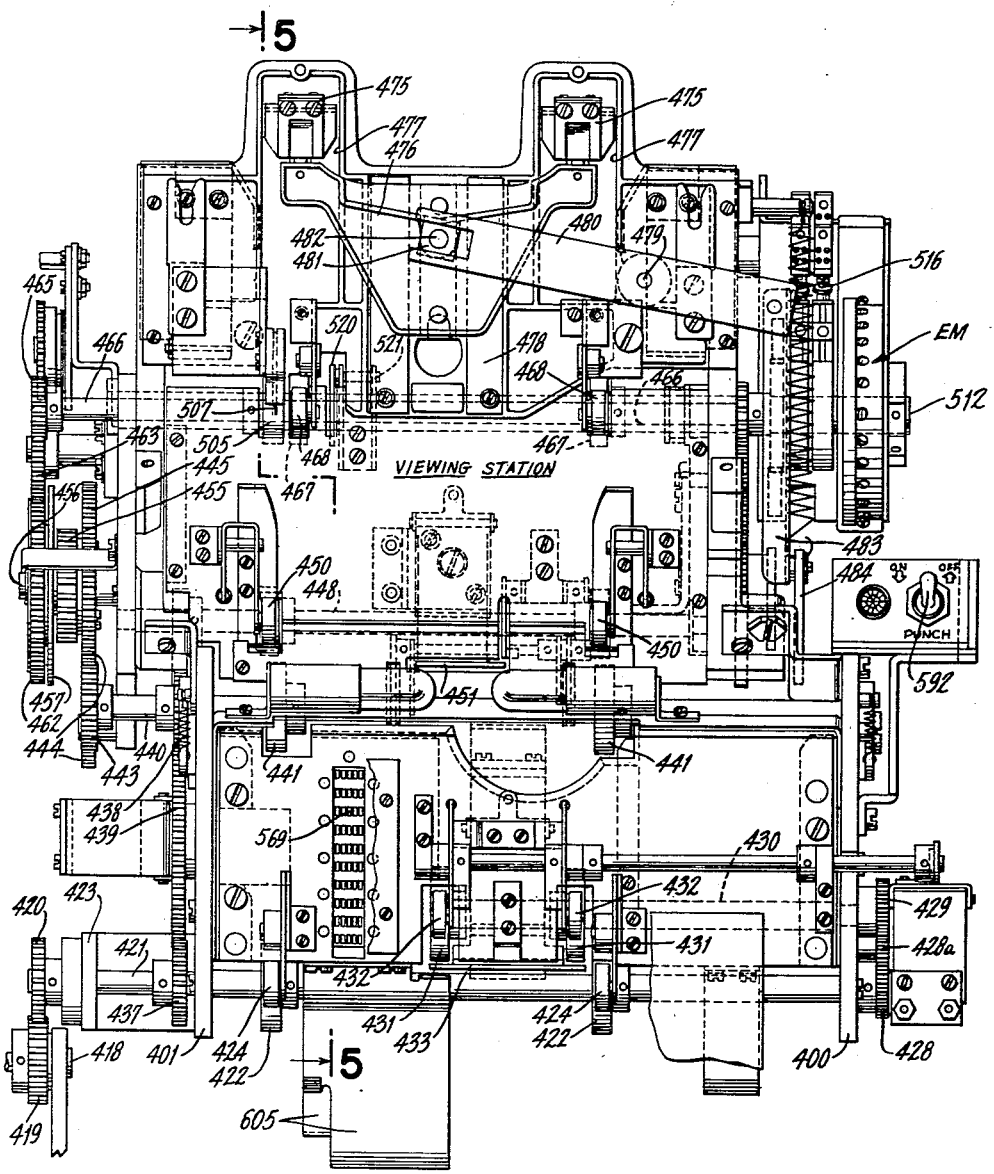
Fig. 4 is a view in front elevation of the card feeding and punching mechanism.

Each card is prepunched in card column No. 1 to represent one of twelve Federal Reserve district numbers at index positions 9–1, 0, X and R, and in accordance with the perforation analyzed an appropriate sorting compartment is selected to receive said card. Referring to Figs. 4 and 5, said shaft 466 carries an insulated disk 505 having an exposed ring against which bears a collector brush 506 and an analyzing brush 507. Said analyzing brush 507 is positioned at column 1 to sense or analyze the Federal Reserve district number representing perforations.

Circuit breaker emitter and punch contacts

Figure 3:
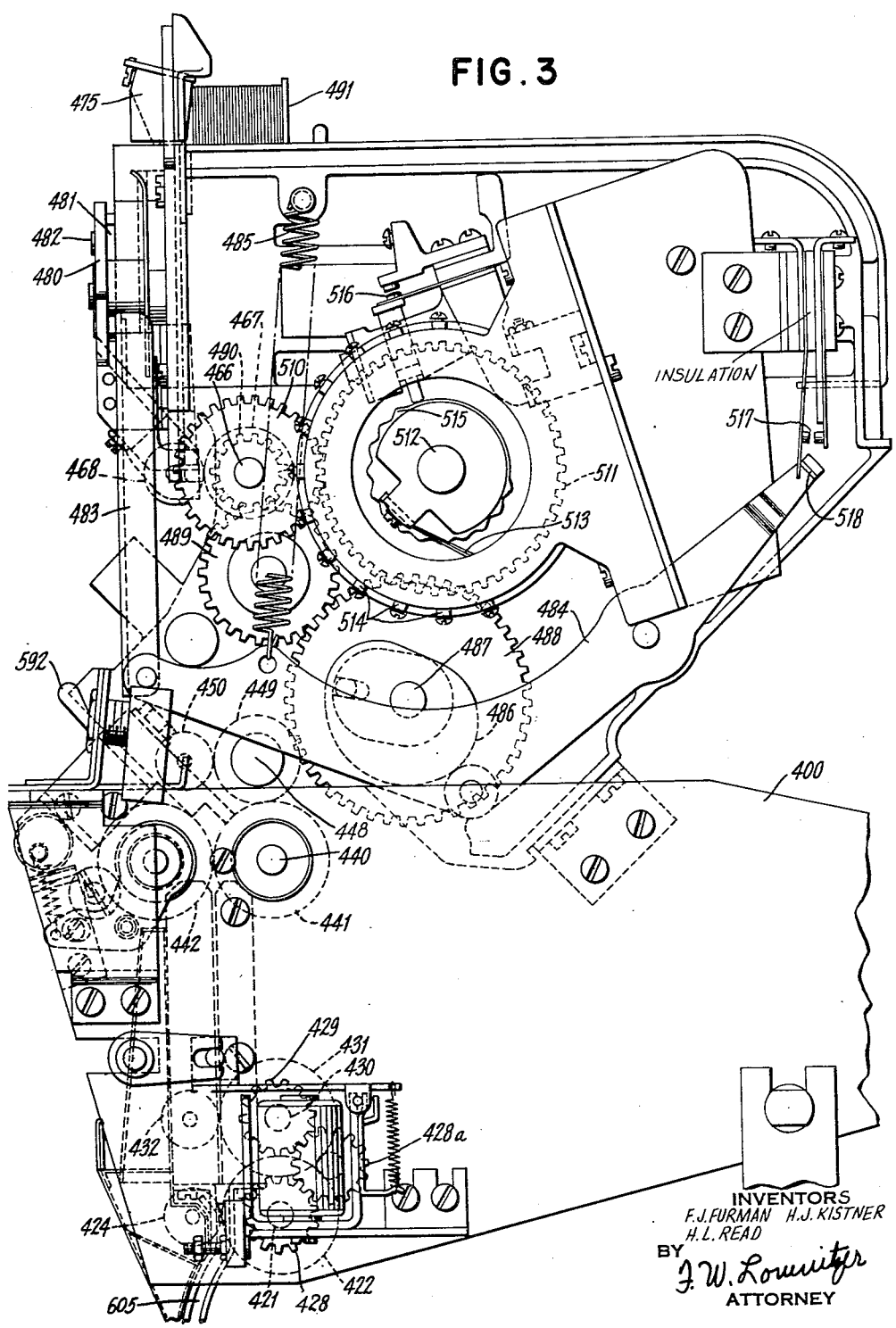
Fig. 3 is a view in side elevation, similar to Fig. 2 but taken at the right side.

Referring to Fig. 3, attached to shaft 466 is a pinion 510 meshing with a gear 511 secured to a shaft 512. Attached to shaft 512 are members carrying brushes 513, one of which makes contact with a collector ring and the other with contact points 514, thus providing an emitter EM of a well known type. Said brush 513 makes successive contact with the contact points 514 timed with the sensing of the index points in the order 9–1, 0, X and R.

The circuit breaker CB is of the well known form and comprises dentated cams 515 on shaft 512 adapted to close the related circuit breaker contacts 516. A duplicate arrangement is provided so as to provide make and break contacts as is well known.

The gearing of the machine is so arranged that shaft 512 is driven two revolutions and, therefore, there would be one operation of the emitter and circuit breaker during the first and second half of each cycle. Since the circuit breaker and emitter are to be used only during the first half of the cycle between 50 and 170° while the card is being sensed they are disconnected from the line side by means of picker knife contacts 517 (Fig. 3). As is shown in Fig. 3 an extension of the follower arm 484 is provided with a lug 518 bearing against one blade of contacts 517. During the clockwise rocking (Figs. 3 and 4) of the follower arm 484 to feed the card downwardly while it is being sensed, lug 518 leaves the blade of contacts 517, enabling them to close and since they are in series with the circuit breaker and emitter, as will be described in connection with the wiring diagram, both are effective during the first half of the cycle. After the sensing of the card and the return of the card pickers the follower arm 484 is in a position determined by cam 486 to again open contacts 517 which are maintained open during the second half of the cycle. Therefore, even though the circuit breaker and emitter operate during the second half of the cycle they are both ineffective.

Upper card lever UCL, intermediate card lever ICL and lower card lever LCL

Associated with the card feeding mechanism and card punching mechanism are card levers provided for the purpose of determining that the cards have been properly fed and are in correct position. They are similar in construction and a general description will be given of each together with their individual functions which will be better understood when the wiring diagram is described.

Upper card lever UCL consists of a lever 520 (Fig. 5) pivoted at 521 and connected to said card lever 520 is a contact operating extension 522 which is adapted to close card lever contacts UCL. Closure of this contact establishes a circuit to the sensing brush 507 and the sorting compartment selecting circuits.

The intermediate card lever 525 (Fig. 5) is adapted to close contacts ICL and the card lever is operated by the card when the card is properly disposed in the viewing station. Its primary function is to render the motor release bar circuit effective when the card lever senses the proper disposition of the card in the viewing station.

The lower card lever LCL consists of a duplicate set of card levers 526 which are operated by the card as it is fed into the punching mechanism. The rocking of these card levers 526 (Fig. 5) by the card closes the lower card lever contacts LCL. When the card is properly located in the punching mechanism the controlling edge of the card drops below the card levers 526, causing the contacts LCL to open. Closure of the card lever contacts LCL as the card is fed downwardly into the punching mechanism controls circuits indirectly to enable the two cycles of machine operation.

Upper and lower card gates

The upper card gate 451 (Fig. 5) disposed just below the feed rollers 449—450 is part of a slidable plate 530 and is in the path of card feed to stop the card in the viewing station. Plate 530 is connected to an armature 532 of the upper card gate control magnet 533, which is energized at the proper time to shift gate 451 to release the card for feed by rollers 449—450 to the punch station.

The card gate 433 for the card punch holds the card in the punching mechanism against the feeding action of feeding rollers 431—432. It is part of a plate 534 mounted in a manner similar to plate 530 and is retracted by the armature 535 of a lower card gate control magnet 536 to allow feed rollers 431—432 and 422—424 to eject the punched card out of the card punching mechanism.

Punching mechanism

The present machine in which the present improvements are incorporated also includes a card punching mechanism for punching under control of the ten-key keyboard 160 (Fig. 1) amounts on the card to be sorted. Since the punching mechanism forms no part of the presently claimed invention it is described here in a general manner and only in as much detail as is necessary to understand that the punch setting mechanism is settable under control of the amount keyboard 160 (Fig. 1) and that it punches a card when it is disposed in the punching mechanism.

The basic machine shown in Patent No. 2,142,352 includes a setting mechanism which is controlled by the ten-key keyboard 160 (Fig. 1) for effecting entries in a selected totalizer, setting up the different compartment printing mechanisms, etc. and from the members which set up the compartment printing mechanisms there are connections shown as Bowden wires 564 (Fig. 5) which are commensurately and differentially set. Said Bowden wires 564 have connections to bell cranks 565 which latter have socket connections 566 to punch selecting interposers 567. The heads 568 thereof are differentially positioned so as to be in engagement with punch pins 569 which are selected and actuated so as to punch holes in a card which is positioned between said punch pins 569 and a die 573. A link 577 is adapted in each cycle of operation of the machine to move a punch bar 571 to the right and through the punch interposer head 568 to actuate the selected punch. The punching mechanism is duplicated so as to punch a plurality of columns of the card corresponding to the digits of the amounts entered in the machine by the ten-key keyboard mechanism.

For further details of construction and operation reference may be had to the application of F. J. Furman et al., Serial No. 256,442, filed November 15, 1951, now Patent 2,745,493.

Storage of district number designation

It has been explained that as a perforated card is being fed from the magazine to the viewing station the hole representing the Federal Reserve District number is sensed by the analyzing or card brush 507 (Fig. 15b) and a representation of the district number is stored up so that it may subsequently control the selection of an appropriate sorting compartment by a predetermined rotation of the sorting drum. The operation of the storage means will be best understood by reference to the wiring diagram comprising Figs. 15a to 15d. The line sides of the electrical supply are designated by reference characters 590 and 591. When the card is fed from the magazine to the viewing station the card lever 520 is operated at 60° of the cycle (Fig. 14) so as to close the UCL contacts which are retained closed for the rest of the cycle and up to 5° of the next cycle. Closure of UCL contacts will complete a circuit from the line side 591 through a punch switch 592 (Fig. 15b) which is now closed (see also Fig. 4), through UCL contacts now closed, to the R28P relay coil (Fig. 15a) to the line side 590, thereby energizing the R28 relay. A holding circuit for said relay is established when cam contacts CB16 close by a circuit from the line side 591 through CB16 cam contacts, R28a hold contacts to the R28H coil back to line 590. From the timing diagram of Fig. 14 it will be seen that a hold circuit is maintained for the R28 relay from 290° to 5° of the next cycle. In Fig. 15c seven relays designated R21 to R27 are shown, the pickup coils P of which are energized singly or in combination to store up a representation of the district number represented by the sensed hole on the card. The impulse circuit is from the line side 591, switch 592, through UCL contacts (Fig. 15b), the picker knife contacts 517 which are closed during the time that the holes are sensed, thence through the analyzing brush 507, contact roll 505 and collector brush 506, through circuit breaker contacts CB, to the brush 513 of the emitter EM. It will be recalled that the emitter brush rotates synchronously with the sensing of the card holes in the order 9–0, X, R, thereby closing circuits through CB contacts to the R21 to R27P relay coils singly or in combination, as will now be described.

It is in the first part of the cycle that said relays are energized to store up the designation. From various contact points 514 there are individual wire connections directly to certain of the storage relays R21 to R27 and also through filters which comprise selenium rectifiers 593 to pass currents to energize supplemental storage relays but prevent unwanted back circuits to energize unwanted relays. For example, if the 9 hole is sensed an impulse is transmitted from the 9 contact point 514 through one rectifier 593 to the R27 coil to line side 590, and also through a supplemental rectifier 593 to the R22 coil to line side 590, thereby energizing both. If brush 513 makes contact with the 7 contact point 514, the R27 relay coil alone is energized if there is a 7 hole. Thus, in accordance with the hole sensed the storage relays are energized according to the following table:

TABLE NO. 1

| Hole | Relays Energized |
|---|---|
| 9 | R27+22 |
| 8 | R27+21 |
| 7 | R27 |
| 6 | R26 |
| 5 | R25 |
| 4 | R24 |
| 3 | R23 |
| 2 | R22 |
| 1 | R21 |
| 10-0 | 27+23 |
| 11-X | 27+24 |
| 12-R | 27+25 |

The R21P to R27P relays are preferably of the latch type. That is to say, when a P relay coil is energized it will transfer its respective "1" and "2" contacts (Fig. 15c) and associated spring-pressed bell crank latch member 594 will engage the intermediate blade to thereby latch the contacts in transferred position, which determine the sorting compartment to be selected. Associated with each storage relay is a dropout coil designated as, for example, R21DO for the R21P relay coil. When the dropout coil is energized by circuits to be subsequently explained it will rock the associated bell crank latch member 594, thereby unlatching it from the intermediate blade and the contacts will return to normal. Summarizing, as a result of sensing the holes representing the district numbers R21 to R27 relays are energized according to the above combination, their contacts transfer and they remain transferred until such time that the contacts are read out so as to determine the particular sorting compartment which is to be selected.

Figure 14:
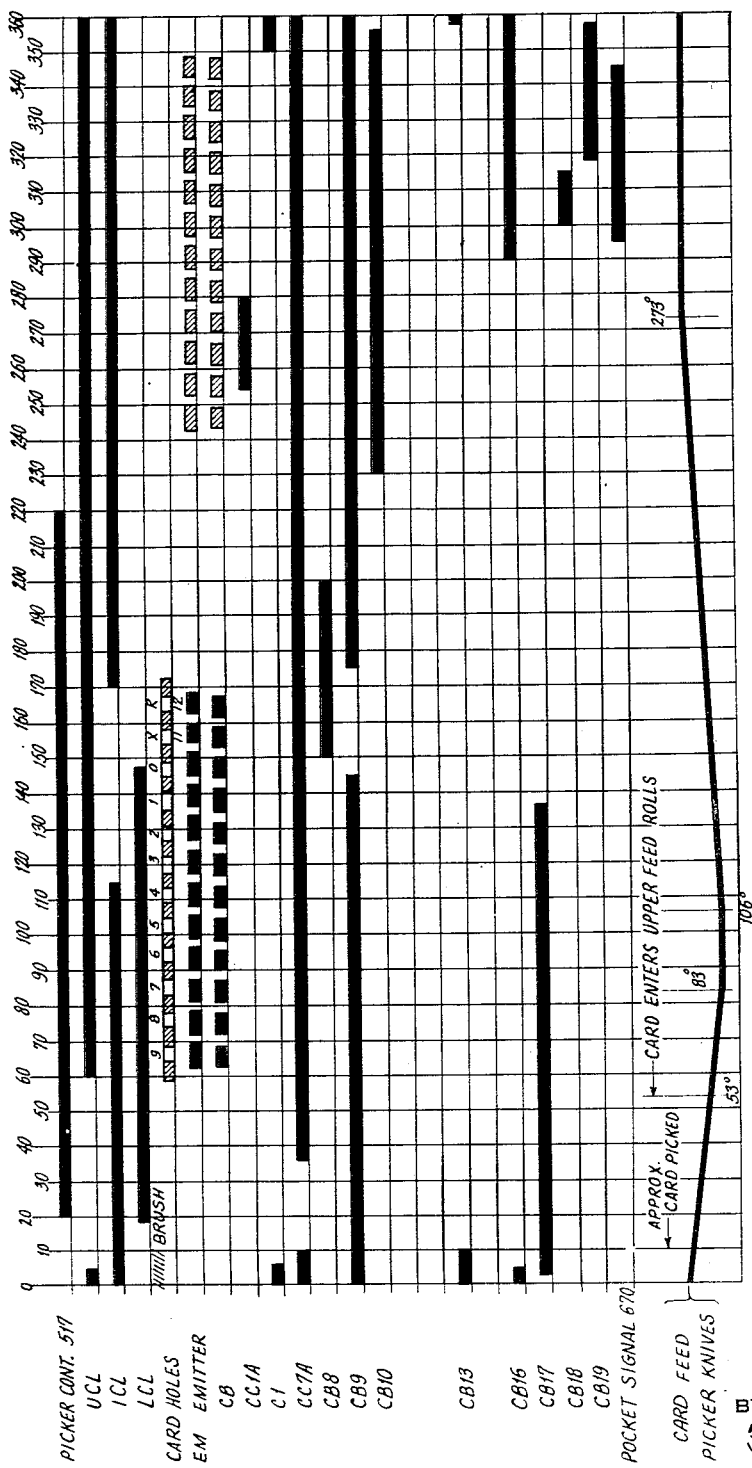
Fig. 14 is a timing diagram.
Figure 15C:
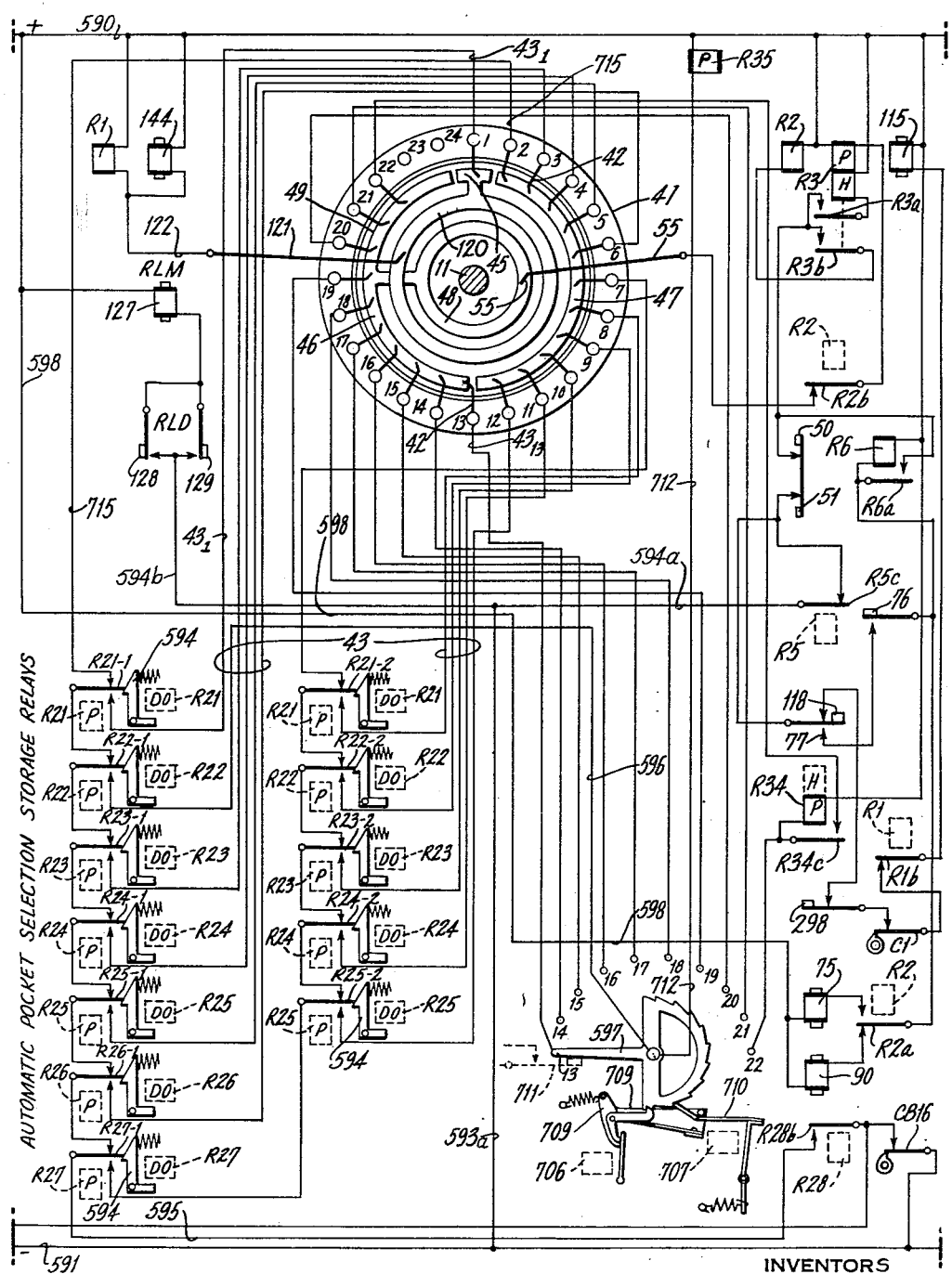

It will be noted from Fig. 14 that the picker knife contacts 517 are closed between 20°–220° and are opened during the second half of the cycle so that even if the circuit breaker CB and emitter EM operate during the second half of the cycle as was described, the opening of said contacts 517 will prevent emission of impulses even in the absence of a card allowing brush 507 to contact the contact roll 505.

The impulse circuit for reading out the 1 and 2 contacts to determine the sorting compartment to be selected is from the line side 591, through cam contacts CB16 (Fig. 15c) which close at about 290° of the cycle in which the designation is stored up, thence through the R28b contacts now closed, to a wire 595. If the R21 relay is energized alone upon sensing a 1 hole its "1" contacts will be transferred so that the impulse from wire 595 will pass through R27–1, R26–1, R25–1, R24–1, R23–1, R22–1, all of which are now normal to R21–1 contacts now transferred, to the wire 43₁. As will be described later on this wire 43₁ will continue a circuit to cause the selection of sorting compartment No. 1. The exit wires 43₁, 2–12 which are connected to the normal open side of either "1" or "2" contacts of the R21—R27 relays continue circuits when such contacts are closed to select the compartments corresponding to the subscript upon the transfer of the contacts singly or in combination. However for the 2 designation (for local items) which causes the energization of the R22 relay alone and the transfer of the R22–1 contacts, the impulse is extended through R22–1 contacts and a wire 596 to a step switch arm 597 of a step-by-step switch distributor. In the position of arm 597 shown in the wiring diagram such impulse would normally select, by wire 43₁₃, the No. 13 sorting compartment but after such compartment is filled a step of movement of the step switch arm 597 will cause the selection of the sorting compartment No. 14, and thereafter if the same filled up condition is found, sorting compartment No. 15 will then be selected for use. Therefore, the "2" district designation will select sorting compartments 13–22 in sequence. The manner in which the various designations select the sorting compartments, in accordance with the Federal Reserve district number designation, is represented in the following table:

TABLE NO. 2

| Compartment Number | District No. Designation— Hole or Perforation | Contacts Closed |
| --- | --- | --- |
| 1 | 1 | R21–1. |
| 13–22 | 2 (Local) | R22–1 and rotary switch arm at 13–22 points. |
| 3 | 3 | R23–1. |
| 4 | 4 | R24–1. |
| 5 | 5 | R25–1. |
| 6 | 6 | R26–1. |
| 7 | 7 | R27–1. |
| 8 | 8 | R27–1, R21–2. |
| 9 | 9 | R27–1, R22–2. |
| 10 | 10–0 | R27–1, R23–2. |
| 11 | 11–X | R27–1, R24–2. |
| 12 | 12–R | R27–1, R25–2. |

*Note.*—Nos. 23 and 24 compartments are selected by compartment selector keys in basic machine but unused for present arrangement. Compartment No. 2 is also selected by compartment selector keyboard in basic machine for insertion of mutilated cards therein and as will be described is selected automatically when district selection hole is absent or not sensed.

The wires 43, of which there are 20 designated by corresponding subscripts, are individually connected to brushes 42 (Fig. 15c) and the particular brush which is rendered "live" by being connected to the line side 591 will effect, as will be described, the selection of the desired sorting compartment.

In order to understand how this is effected there will now be described the mechanical and electrical construction of the card sorting mechanism.

*Card sorting mechanism*

Figure 1:
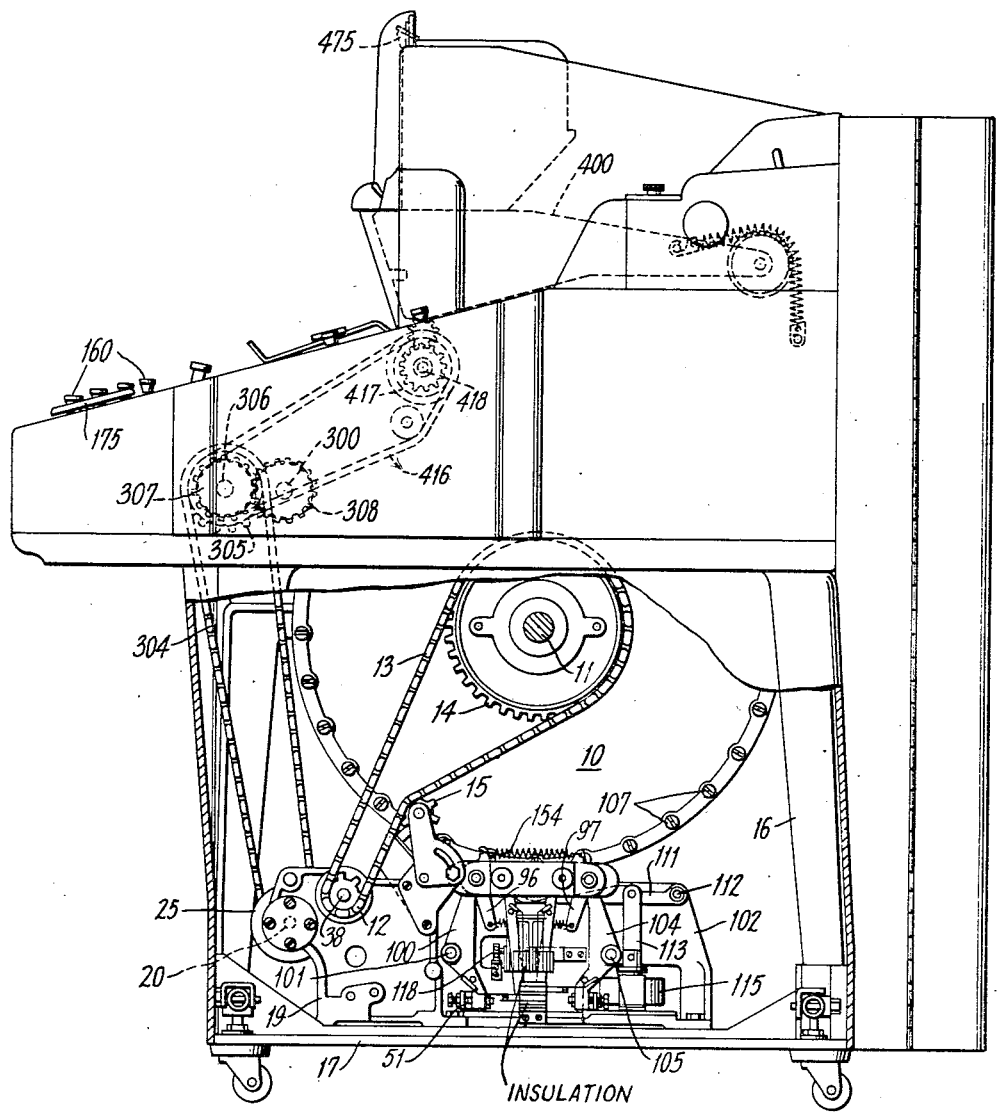
Figure 2:
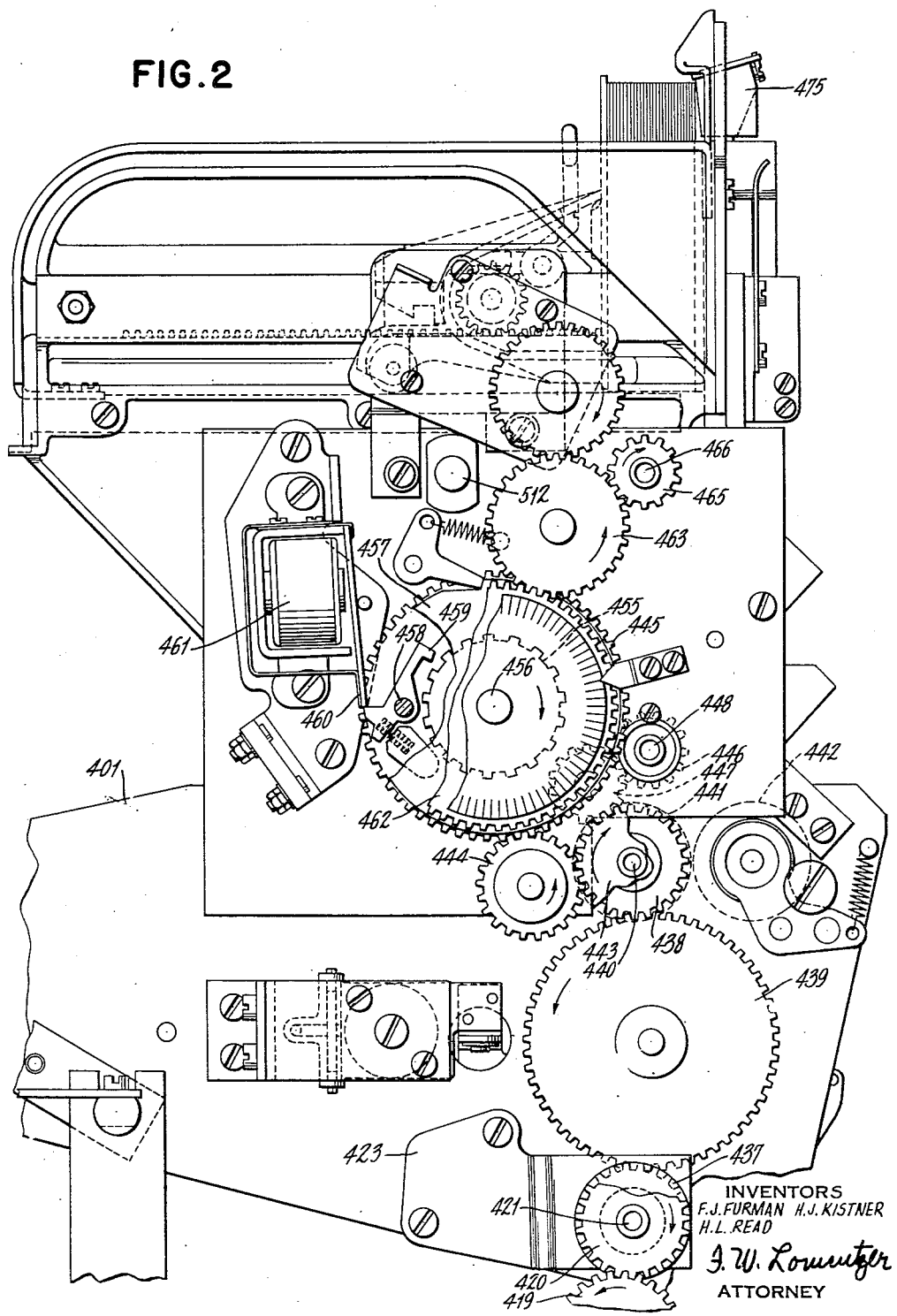
Fig. 2 is a view in side elevation of the left side of the card feeding and card punching mechanism, showing mainly the drive gears and the one revolution clutch.

Referring to Fig. 1, the drum 10 is securely mounted on the shaft 11, suitably and rotatably supported in the main framework of the machine. The drum 10 is adapted to be driven by a continuous running motor (not shown) through a two-way clutch which drives a sprocket gear 12 (Figs. 1 and 6) in either direction. A chain 13 passes around sprocket gear 14 secured to the shaft 11. An adjustable idler gear 15 insures the proper tension on the chain 13.

The machine is mounted in a framework indicated generally at 16, and is supported on a base 17. The two-way clutch mechanism is mounted between a pair of brackets 18 and 19 (Fig. 8) secured to the base 17. The motor (not shown) is mounted on the base 17 and drives the clutch mechanism through a shaft 20 mounted in the brackets 18 and 19 and directly connected to the armature shaft of the motor. Secured to shaft 20 midway between the brackets 18 and 19 is a driving clutch member 21, comprising a pair of clutch plates 22 and 23, which rotates continuously with the shaft 20 in the direction indicated by the arrow in Fig. 8. Rotatably mounted on the shaft 20 adjacent the driving clutch members 21 are driven clutch plates 24 and 25, each provided with suitable clutch facing material indicated at 26.

The clutch plate 24 is mounted on a sleeve 27, which sleeve is also integral with a gear 28. The clutch plate 25 is similarly connected by a sleeve 29 to a gear 30 on the shaft 20.

The gear 28 meshes with an intermediate gear 36 (Fig. 6) which meshes with a gear 37 fast on a shaft 38 mounted in the brackets 18 and 19 and on which is secured the sprocket gear 12. The gear 30 meshes with a gear 39 fast on shaft 38.

Obviously, if the clutch plate 24 is brought into operative contact with the driving plate 22 the clutch plate 24 and the gear 28 will be driven in a clockwise direction, and, through the gear 36 will drive the gear 37, shaft 38 and sprocket gear 12 also in a clockwise direction to rotate the drum 10 in the same direction. However, if clutch plate 25 is brought into contact with the driving plate 23 the plate 25 and the gear 30 are rotated clockwise. The gear 30 meshing directly with the gear 39 drives shaft 38 and sprocket gear 12 in a counterclockwise direction to rotate the drum 10 counterclockwise.

The selective movement of clutch plates 24 and 25 to contact with the plates 22 and 23 is controlled by the position in which the drum stands and by the particular district number designation analyzed and stored up. Fixed to the framework of the machine and surrounding the drum shaft 11 is a ring 41 (Fig. 15c) of insulating material upon which is mounted a series of brushes 42 arranged annularly about the ring 41, there being a brush 42 for each sorting compartment.

A commutator comprising conducting segments 45, 46 and 47, and a collector ring 48 shown diagrammatically in Fig. 15c mounted in a disk 49 of insulating material is fixed to the drum shaft 11 adjacent the ring 41. The brushes 42 are carried by the ring 41 and contact with the segments 45, 46, and 47. When the drum 10 is at rest the segment 45 is in contact with the brush 42 associated with the last compartment selected. The segment 46 is electrically connected to the collector ring 48 by a radial strap of conducting material.

Assuming that the sorting drum is now standing at the last selected No. 1 compartment position at which time the "1" brush 42 is in contact with segment 45, as shown in Fig. 15c, and a different compartment is selected, the R1 relay and magnet 144 will not be energized when the machine is cycled and CB16 cam contacts close at 290°. This open circuit is from line side 591, cam contacts CB16, R28b contacts now closed, wire 595, serially through certain contacts which are opened or closed according to the designation storage relays R21—R27 energized or deenergized, to a wire 43 associated with the new compartment to be selected and its connected brush 42, but since it does not now contact segment 45 the circuit which would be completed by brush 121, wire 122 to R1 relay and magnet 144 is open at this point. But when cam contacts C1 close later at about 350° the following circuit is completed. Line side 591, wires 593a, 594a, R5c contacts now closed, contacts 118 now closed, contacts 298 now closed, C1 cam contacts, R1b relay contacts now closed, magnet 115 to line side 590.

The drum 10 is normally held in position by a pair of stop arms 96 and 97 (Figs. 6 and 9) and is also accurately aligned in position by a slidable lock plate 98 (Figs. 6 and 8). The stop arm 96 is pivotally supported at 99 (Fig. 9) by a pair of arms 100 pivoted on a stud 101 projecting from a frame 102 secured to the base 17. The stop arm 97 is similarly supported at 103 by a pair of arms 104 pivoted on a stud 105 in the frame 102. A spring 106 stretched between projections of the arms 96 and 97 normally holds these arms in their effective or raised positions.

The stop arms 96 and 97 as well as lock plate 98 cooperate with studs 107 secured to the side of the drum 10, there being a stud 107 for each compartment position on the drum. Before the drum can be rotated it is necessary to withdraw the arms 96 and 97 clear of the particular stud 107 between said arms and withdraw lock plate 98 from a stud 107. To this end the stop arms 96 and 97 are provided with hooked projections 108 and 109, respectively. Extending immediately above these projections is a stud 110 carried by the free end of a lever 111 pivoted on a stud 112 (Fig. 6) in the frame 102. A link 113 pivotally connected to the lever 111 has secured to its lower end the armature 114 of a solenoid 115.

Energization of the solenoid 115 attracts its armature 114, drawing the link 113 downwardly and rocking the lever 111 counterclockwise. This movement of the lever 111, through the stud 110, rocks the stop arm 96 clockwise and the stop arm 97 counterclockwise, thus moving said stop arms out of the path of the stud 107 with which it is now engaged.

As the latch arms 96 and 97 approach the lower limit of their movement caused by the energization of solenoid 115, ears 124 formed on the free ends thereof, come below the bent end of a latch arm 125 (see Fig. 7), which arm is immediately rocked counterclockwise (Fig. 7) by a spring 126 to latch the stop arms 96 and 97 down in their ineffective positions.

The arm 125 is pivoted at 139 (Fig. 7) and has a horizontally extending tail 140 (Fig. 6) to which the spring 126 is attached. The tail 140 carries an insulating roller 141 which cooperates with a blade of contacts 118 and 77. As the latch arm 125 rocks counterclockwise to latch the stop arms 96 and 97 down, the tail 140 through the roller 141 opens contacts 118 and closes contacts 77. When the contacts 118 are opened the previously described circuit to solenoid 115 (Figs. 6 and 9) is opened and solenoid 115 deenergized, allowing a spring 142 (Fig. 6) to raise the arm 111, link 113 and armature 114 to their upper positions.

Also before the drum 10 is free to rotate the lock plate 98 (Fig. 8) must also be removed to ineffective position.

The notch 98a of this plate as shown in Fig. 6 normally engages one of the studs 107. The lock plate 98 is attached to the armature of a solenoid 127 and is withdrawn by solenoid 127 (Figs. 6 and 8) when it is energized under control of contacts 128 and 129 (Fig. 6) closed by the stop arms 96 and 97 when they are withdrawn to free the drum for rotation. Mounted near the stop arms 96 and 97 are the pair of contacts 128 and 129 electrically connected in parallel (see Fig. 15c) and having their inner blades bent outwardly at an angle (see Fig. 6). These angular ends of the inner blades carry blocks 130 of insulating material (Fig. 8). Studs 136 and 137 (Fig. 8) projecting respectively from the links 96a and 97a (Fig. 9) pivoted to respective stop arms 96 and 97 cooperate with the blocks 130 (see also Fig. 6) to hold the pairs of contacts 128 and 129 open when the stop arms are in their effective positions. When the stop arms 96 and 97 are pulled down to unlock the drum 10 the studs 136 and 137 are carried out of contact with the blocks 130, whereupon the contacts 128 and 129 are closed by the spring tension of one of the blades.

Closure of contacts 128 or 129 (see Fig. 15c) completes a circuit from line side 591, wire 593a, wire 594b, contacts 128, 129, solenoid 127 to line side 590, which attracts its core 138 (Fig. 8) and shifts the lock plate 98 clear of the stud 107.

Lock plate 98 has a stud 95 (Fig. 8) which rocks a bell crank 94 to close contacts 76 and open contacts 143 when the lock plate 98 is rocked clear of the stud 107. The drum is now free to rotate and the selected clutch magnet 75 or 90 is energized by the following described circuit to rotate the drum to its newly selected position.

If, for example, the "13" compartment is to be selected, the wire 43₁₃ would extend the circuit to No. 13 brush 42, to complete a circuit from such brush, segment 46, ring 48, a brush 55, R2b interlock contacts now closed, the R3 or reel reverse control relay, to line side 590. A holding circuit for R3H coil is through the R3a contacts, reel stop timing contacts 50 and 51, R5c relay contacts, wires 594a, 593a to line side 591. R3b contacts close to pick up the R2 reel reverse control relay by a circuit from line side 590, R2 relay, R3b contacts, contacts 50, contacts 51, R5c relay contacts, wires 594a, 593a to line side 591. Energization of R2 relay now transfers its R2a contacts, completing a circuit when contacts 76 are closed, from line side 590, wire 598, clutch control magnet 75, R2a relay contacts now transferred, contacts 76 now closed, contacts 77, relay contacts R5c, wires 594a, 593a to line side 591. This energizes clutch control magnet 75. Closure of contacts 76 also completes a circuit to the R6 relay.

Referring now to Fig. 8, when the clutch control magnet 75 is energized it attracts its armature 78 which is carried on the end of a lever 79 pivoted at 80 on a bracket 81 mounted between the brackets 18 and 19. This rocks the lever 79 clockwise (Fig. 8).

Pivotally carried by the lever 79, at the end opposite the armature 78, is a pair of yokes 82 and 83. These yokes carry rollers 84 and 85 projecting into annular grooves 86 and 87 in the sleeves 29 and 27, respectively. At their opposite ends the yokes 82 and 83 carry adjusting studs 88 and 89 bearing against the bracket 81.

When the lever 79 is rocked clockwise under the influence of clutch control magnet 75, it rocks the yoke 82 also clockwise, bringing the clutch plate 25 into contact with the driving member 23, whereupon the gear 30 is driven clockwise (Fig. 6) rotating gear 39 and sprocket gear 12 counterclockwise to rotate the drum 10 in the same direction until the segment 45 contacts the No. 13 brush 42. The drum is stopped in this position by mechanism later to be described.

Assuming now that the "12" designation is sensed with the No. 1 compartment previously selected and the drum 10 standing in the "1" position, the drum will rotate in the opposite or clockwise direction to bring the "12"

compartment into registry with the check feeding aperture.

Referring to Fig. 15c it may be seen that the No. 12 brush 42 is in contact with the segment 47. This segment 47, having no connection to the ring 48, is ineffective to energize the R3 relay, or the R2 relay. Therefore, upon closure of contacts 76 a circuit is established from the line side 590, wire 598, a second clutch control magnet 90, R2a contacts now normal, contacts 76 now closed, contacts 77 now closed, R5c relay contacts now closed, wires 594a, 593a to line side 591. Closure of contacts 76 also completes a circuit to the R6 relay.

Energization of magnet 90 rocks the arm 79 (Fig. 8) counterclockwise, engaging the clutch plate 24 with the driven plate 22, which, through the gears 28, 36 and 37, rotates the sprocket gear 12 and the drum 10 clockwise until the segment 45 contacts the "12" brush 42.

When magnet 90 is energized the R6 relay is energized, and when magnet 75 is energized R6 relay is also energized. R6 relay and selected clutch magnet 75 or 90 are held energized through R6a contacts and contacts 50, 51 until the latter open when a selected compartment arrives at the upper position; R6 relay keeps the selected clutch magnet 75 or 90 energized after contacts 76 open and until the contacts 50, 51 are opened in a manner now to be explained.

Each of the arms 100 and 104 has a respective depending projection 100a and 104a (Fig. 6). As will be explained when the stud 107 strikes the stop arm 97 the latter is moved to the right and rocks arms 104 clockwise and the arm 104a also clockwise to allow contacts 50 to open. When the stud 107 strikes the stop arm 96 it rocks arms 100 counterclockwise and the arm 100a in the same direction to allow contacts 51 to open. Thus, in either direction of rotation of the drum 10 contacts 50, 51 are opened at the proper time to deenergize the R6 relay and the selected clutch magnet 75 or 90, even after contacts 76 have been opened. This insures a power drive of the drum to the newly selected position.

The drum continues to rotate after a run-in cycle, or at the end of the second of the two cycles of machine operation until it arrives at the position where the selected compartment determined by the card last sensed comes opposite the check receiving aperture, whereupon the rotation of said drum is arrested and the drum is accurately aligned in position by mechanism now to be described.

It will be remembered that the commutator comprising the segments 45, 46, 47 and rings 48 and 120 (Fig. 15c) rotates with the drum 10, whereas the disk 41 together with the brushes 42, 55 and 121 remain stationary. As soon as the segment 45 contacts the brush 42 corresponding to the compartment selected and just before the drum is at its newly selected position a circuit is established by the effective wire 43, the related brush 42, segment 45, ring 120, brush 121, wire 122, magnet 144 and shunted R1 relay to line 590. Energization of magnet 144 (see Fig. 7) attracts its armature 145, which is secured to the latch arm 125, rocking the latter clockwise (Fig. 7) to free the stop arms 96 and 97, and also open contacts 77 and close contacts 118 to deenergize magnet 115. Contacts 77 open to assure no hold circuit to R6 relay and clutch magnets 75 or 90 when contacts 50, 51 open. Since a change in the position of the sorting drum requires energization of magnet 115 through contacts 118, the latter are now closed. The spring 106 (Figs. 6 and 9) immediately throws the stop arms upwardly to effective drum locking position. When the stop arms move upwardly and the drum comes to a complete rest, contacts 128 and 129 open to deenergize magnet 127 which allows lock plate 98 to engage a stud 107 and at the same time open contacts 76 and close contacts 143. Although contacts 76 open, the selected clutch magnet 75 or 90 is held energized until contacts 50, 51 open. If the drum 10 is rotating in a clockwise direction the stud 107 wipes over stop arm 97 and strikes arm 96. If rotating counterclockwise the stud 107 wipes over arm 96 and strikes stop arm 97. It will be recalled that this results in opening either contacts 50 or 51.

A slide 146 (Fig. 8) is pivoted at its left-hand end on the stud 99 on which the stop arm 96 is pivoted. The slide 146 is slotted at 153 to surround and slide over the stud 103 so that as the stud 99 moves to the left the slide 146 moves in the same direction. Similarly a slide 147 has one of its ends pivoted on the stud 103 on which is pivoted the stop arm 97. The slide 147 is slotted at 148 (Fig. 6) to slide over the stud 99 so that as the stud 103 moves to the right the slide 147 moves in the same direction. Between the slides 146 and 147 is fixedly mounted a friction plate 149 (Fig. 8) of suitable friction producing material. The slides 146 and 147 are pressed against friction plate 149 by springs 150 surrounding studs 151 carried by the slide 146 and projecting through suitable slots in slide 147. The studs 151 pass through holes in the friction plate 149 to hold it in position between plates 146 and 147. Between ears 155 of plates 146 and 147 a spring 154 is stretched. Between the studs 99 and 103 is stretched a spring 153a.

Assuming, for example, that the drum 10 is rotating counterclockwise, the stud 107 strikes the stop arm 97 (Fig. 6), and moves the slide 147 to the right. The shock of the blow is absorbed by the friction between the slide 147 and friction plate 149 and by the extension of spring 154, which spring reacts to bring the stud 107 and the drum to the position wherein the selected compartment is in registry with the card receiving chute. When the stud 107 again strikes the stop arm 97 it stretches spring 154 (Figs. 6 and 8) and stud 107 then rebounds against arm 96 and when stud 107 strikes the stop arm 97 the action just described occurs but to a lesser degree. This rebound or "chatter" would be quite extensive if only the spring 154 was depended upon to bring the drum to rest. The friction member 149 is provided to dampen the rebound action effected by the spring 154.

When the inertia of the drum has been overcome by the brake friction plates and spring 154, both arms 96 and 97 will be up, allowing both contacts 128 and 129 to open to deenergize magnet 127 which allows lock plate 98 to engage a stud 107.

It is necessary that the lock plate 98 (Fig. 6) be maintained in its ineffective position until the drum 10 has come to a complete rest. This is effected by maintaining one or the other of the contacts 128 and 129 closed until the drum is completely stopped. This maintains the magnet 127 (Fig. 6) energized to hold the lock plate 98 in its disengaged position. When the stud 107 strikes the stop arm 97 this arm, as stated above, is moved to the right (Figs. 6 and 8), carrying the stud 137 therewith away from the insulating block 130. This permits contacts 129 to remain closed. When the spring 154 rebounds, carrying the drum 10 and stud 107 back past center, said stud 107 strikes the stop arm 96 moving it slightly leftward, at which time the stud 136 is carried away from the insulating block 130. This permit contacts 128 to close. Thus, if the stud 107 is off center in either direction one or the other of the contacts 128 and 129 is closed. As soon as the drum comes to a complete rest, both contacts 128 and 129 are opened, deenergizing the magnet 127, whereupon the lock plate 98 is shifted by a spring 156 (Fig. 8) to accurately align the drum.

*Motor release bar—run-in or single cycle of operation*

The first depression of the motor release bar feeds a card to the viewing station. After the amount is set up by the ten-key mechanism 160 of the basic machine and the drum has been stopped at the selected compartment position the motor release bar 175 (Fig. 1) is again depressed. This will cause feeding of the first card from the viewing station to the punching station, the punching of this card, and a second cycle to cause feeding of a following card to the viewing station and the punched card to the selected compartment determined by the first card fed to the viewing station in the run-in cycle. As best shown in Fig. 1 the motor release bar 175 is positioned exteriorly of the cabinet of the machine for a manual depression.

The motor release bar 175 (Fig. 10) is mounted upon and carried by a slidably mounted key stem 296 carrying a contact roll 297 of insulation which, when the key stem is depressed, closes contacts 299 and opens contacts 298.

Opening of interlock contacts 298 (Fig. 15c) opens the circuit to the solenoid 115 to prevent starting the rotation of the sorting drum while the machine is being cycled, as will be explained for "run-in" and "two cycles" operations. Closure of contacts 299 completes, when the first card is fed from the magazine, a circuit from line side 591, through contacts 299 (Fig. 15d), and through the following relay and mechanical interlock contacts which will be described later but which are all normally closed, R4a relay contacts, contacts 143, R1b, R31b, R5d relay contacts now closed, clutch release magnets 301 to line side 590. R1b contacts prevent operation of the motor release bar 175 during the rotation of the sorting drum.

A parallel circuit extends through CB17 cam contacts, R30c relay contacts now closed, punch feed clutch magnet 461 to line side 590. Thus, both the basic machine clutch magnet 301 (Fig. 10) and punch clutch magnet 461 (Fig. 2) are energized simultaneously and the clutches will engage approximately together.

Secured to the constantly rotating motor-driven shaft 20 of the machine is a sprocket gear 302 (Fig. 8) around which passes an endless chain 304 (Fig. 1) driving a sprocket gear 305 attached to a shaft 306. Attached to shaft 306 is a gear 307 meshing with a gear 308 loosely mounted on the shaft 300 and to which gear 307 a ratchet wheel 303 (Fig. 10) is fastened. Attached to the shaft 300 is a disk 309 pivotally carrying a spring-pressed clutch pawl 310 having a tail 311 normally engaged by a shoulder or a hook 312 of a clutch control arm 313. By means of a link 314 the clutch control arm 313 is connected to an arm 315 by a pin 316 carried by said arm 315 engaging a slot 317 in the end of the link 314, said arm 315 being secured to a rock shaft 319 and also having a slot receiving a pin 318 carried by the key stem 296. Attached to rock shaft 319 is a plate 345 carrying a pin 346 receiving a shoulder 347 of a spring-urged detent or latch plate 348 when the motor release bar 175 is depressed to latch it depressed. As is well known, at the end of the cycle a hook 350 of a link 277 forming part of the ten-key mechanism will strike a finger 349 of detent plate 348 to unlatch the motor release bar 175.

From Fig. 10 it will be seen that the armature 330 of the magnets 301 is integral with the arm 313 so that the energization of magnets 301 will rock the clutch control arm 313 to remove the shoulder 312 from the tail 311, thereby permitting a spring 321 to rock the clutch pawl 310 into engagement with the ratchet wheel 303, thus rotating the drive shaft 300.

At about 254° of the rotation of shaft 300 a cam carried thereby will close cam contacts CC1A (Figs. 14 and 15d), thereby closing a circuit from line side 591 through R30a interlock contacts now closed, the R4 relay, to line side 590. The latter will now transfer R4a relay contacts, thereby opening the circuit to the clutch control magnets 301 and even if the motor release bar is held depressed it will be seen that a spring 322 (Fig. 10) will rock the armature 330 and clutch release arm 313 so that at the completion of one revolution of the disk 309, and therefore shaft 300, the shoulder 312 of arm 313 will engage the clutch pawl 311 and disengage it from the ratchet wheel 303. In this case the slot 317 in the link 314 will permit the movement of the link 314 to the left without effecting the movement of the motor release bar 175.

Figure 15D:
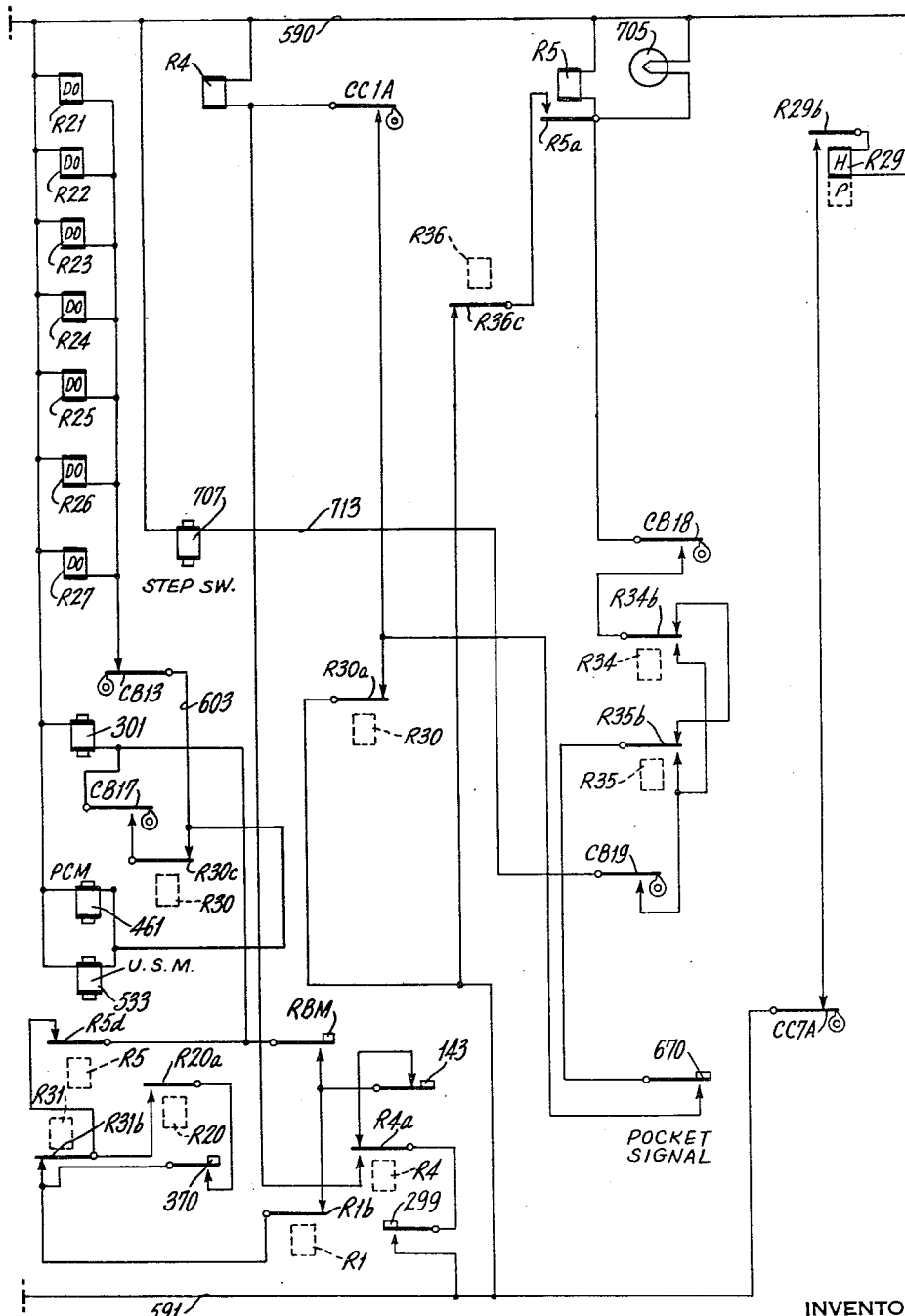

When the relay contacts R4a transferred it will be seen from Fig. 15d that a holding circuit for the R4 relay is closed to retain R4 relay energized, and its contacts R4a kept transferred, as long as the motor release bar 175 is held depressed and contacts 299 are closed. When the motor release bar 175 is released after a cyclic operation spring 323 will raise the motor release bar 175 and key stem 296, opening contacts 299 to cause the deenergization of the R4 relay, and the transfer of the R4a relay contacts back to normal. Thus, for the first card feed only a single revolution of the drive shaft 300 can be effected even though motor release bar 175 is held depressed. However, as will be subsequently described, after feeding of the first card to the viewing station, the next depression of the motor release bar will cause two cycles to ensue for each card fed after the first. This is effected by preventing the R4 relay from being energized because of opening of contacts R30a before a second cycle has been completed.

It should be further noted that when the motor release bar 175 is depressed the contact roll 297 carried by the stem 296 will permit contacts 298 to open, thus opening a circuit to the solenoid 115 and render the sorting drum selecting mechanism inoperative during the opening of these contacts, and when contacts 298 close to cause rotation of the sorting drum to select another compartment after the "run-in" cycle or at the end of the second of two cycles of operation.

Reference has been previously made to certain cam contacts and in this section to CC1a cam contacts. These, as well as all other cam contacts, are controlled by cams rotated by shaft 300, to open and close their contacts with the timing shown in the timing diagram of Fig. 14.

As shown in Fig. 10, armature 330 causes in an obvious manner, the closure of RBM contacts when clutch magnets 301 are energized. These contacts, as shown in Fig. 15d, shunt contacts R1b, R31b, R5d, some of which may open during the machine cycle, and thus RBM contacts provide for the proper energization of clutch control magnets 301 irrespective of their opening.

*Card feed and punching cycles*

In the preceding section it was described how, upon the first depression of the motor release bar 175, the first card from the magazine is fed to the viewing station and held there by means of the card stop 451, after which the sorting drum is rotated to select a compartment. Thereafter, the amount keys are depressed during the rotation of the sorting drum to set up in the machine the amount represented on the card brought into view. In order to punch and sort this card a second depression of the motor release bar 175 is made by the operator and two cycles of operation of the machine will then ensue. During the first cycle the first card is fed to the card punching mechanism and concurrently the following card is fed from the magazine to the viewing station and retained there. A second cycle automatically follows so that the card which has been punched by the punching mechanism during the first cycle is automatically fed into the selected compartment. Thereafter, the sorting drum is rotated to select a compartment determined by the following card.

When a card is fed into the viewing station ICL card lever contacts close at 170 (see Fig. 14) to energize the R20 relay coil and the R31P relay coil by a circuit from the line side 591 (Fig. 15b) through punch switch 592, ICL card lever contacts (Fig. 15a) relays R20 and R31P, to line side 590. A hold circuit for the R31 relay is from the line side 590 through R31H relay coil, R31a and R4b relay contacts, through punch switch 592 to line side 591. When CC1A cam contacts close at 254° to pick up R4 relay, R4b relay contacts will deenergize R31H relay coil during the run-in cycle at 254°. Therefore, the R31H relay coil is held energized only between 170 to 254° of the run-in cycle. For other cycles since ICL is closed at 0° (see Fig. 14), R31 relay will be held energized to 254° when R4b contacts open. This overlaps the opening from 115° to 170° of ICL card lever contacts thereby retaining the R31H and R20 relay coils, once they are picked up, continuously energized.

Referring to Fig. 15d the R31 relay coil, once it is energized opens the R31b relay contacts, thereby preventing the closing of the circuit to motor release bar clutch magnets 301, punch feed clutch magnets 461, and upper card stop magnet 533 which is in shunt with magnets 461, even if the motor release bar 175 is depressed. However, a shunt circuit is provided across R31b contacts which consists of contacts 370 and the R20a relay contacts. Contacts 370 are closed in the manner shown in the aforementioned application of F. J. Furman et al., Serial No. 256,442, filed November 15, 1951, and are controlled by the ten-key keyboard. If at least one digit is set up contacts 370 are closed, thus enabling an effective operation of the motor release bar 175.

Release of first card in viewing station

The release of the first card in the viewing station is effected by the lateral movement of the upper card gate or stop 451 when magnet 533 is energized. Referring to Fig. 15d, it will be observed that the upper card stop control magnet 533 is in shunt with the punch clutch magnet 461 so that early in the first cycle said magnet 533 is energized to attract its armature 532 and move the card stop 451 out of engagement with the leading edge of the first card. The card is now free to be fed into the punching mechanism by the set of rollers 449—450 which are continuously rotating, but of the slip type. Said rollers feed the card to rollers 441—442 which are continuously running but not of the slip type which latter rollers feed the card to the bite of rollers 431—432 which are continuously rotating and also of the slip type. This will project the leading edge of the card against card stop 433, thus retaining the first card in the punching mechanism. The card arrives in the punching mechanism at approximately 144° of the first cycle and the card is retained here during the punching operation to about 231° after which it is released for further downward movement to the feed rollers in the chute of the sorting mechanism of the basic machine. The punched card arrives at said feed rollers at about 360° of the first cycle.

Initiation of second cycle automatically

Early in the first cycle at about 19° (see Fig. 14) card lever 526 is rocked to close the LCL contacts which closes a circuit from the line side 591, through punch switch 592, LCL card lever contacts (Fig. 15a) to the R29P relay coil to the line side 590. Card lever 526 will close LCL contacts between 19 to 144° of the first cycle (see Fig. 14). A hold circuit for this relay is from the line side 590, R29H relay coil (Fig. 15d), R29b relay contacts and cam contacts CC7A to the line side 591. This hold circuit will retain R29 relay energized to 10° of the next cycle.

It has been explained that the release bar clutch magnet 301 and the punch clutch magnet 461 are energized simultaneously. However, their clutch teeth may not be in synchronism and there will be a variation in time when the punch clutch is engaged. They will engage approximately together but actual synchronism does not occur nor is it necessary. Due to the roving teeth of the ratchet wheels of both clutches the punch feed clutch may be engaged dissynchronously and accordingly the card to be punched may arrive in the punching mechanism (Fig. 5) 22½° before or 20° after the nominal arrival time of 144° at the card stop 433. Accordingly, there may be a variation in the timing of the card levers as shown in the timing diagram which is taken into consideration in the design of the electrical circuits.

At 150° CB8 cam contacts close to complete a circuit from the line side 591 to punch switch 592, CB8 cam contacts (Fig. 15a), through R29c contacts, to R30P relay coil to the line side 590, R30d contacts providing a hold circuit until CB8 opens at 200°. A further hold circuit for R30H relay coil is from the line side 590 through R30H relay coil, R30b relay contacts, CB9 cam contacts, through punch switch 592 to line side 591. The CB8 cam contacts hold R30P relay coil through R30d contacts to 200° but CB9 cam contacts take over when they close at 175° and hold the R30 relay coil energized up to 145° of the next cycle.

Since the R30 relay coil is energized and its contacts R30a (Fig. 15d) having opened at 150° they are open between 254° to 280° of the first cycle, the closure of CC1A cam contacts during this time will be ineffective to pick up the R4 relay coil and since this non-repeat R4 relay is now ineffective the clutch (Fig. 10) of the basic machine will be held engaged even if the motor release bar 175 is up and the machine will go through another cycle.

In the first run-in cycle the R30c relay contacts are closed between 2° to 137° when CB17 cam contacts (Fig. 15d) close to energize clutch magnet 461 as well as the upper card stop magnet 533. The sorting drum rotates to a new position as a result of the analysis of the card fed to the analyzing station during this run-in cycle. In the second cycle (first cycle of a pair of cycles) R30c contacts are closed in order that the first card in the viewing station can be released to be fed to punching station, and the second card in the magazine can be fed to the viewing station. While LCL contacts close at 2 degrees of this cycle the R30 relay is not energized until 150 degrees of the cycle. Therefore, R30c contacts have remained closed to 150 degrees of this cycle to permit feeding the first and second cards. In the third cycle or second cycle of a pair of cycles during the time that the CB17 cam contacts are closed R30c relay contacts are open and thus the upper card stop magnet 533 is not energized and card stop 451 is retained in the card stopping position to retain the card fed in the first cycle in the viewing station. Also, since card feed clutch magnet 461 is not energized at the end of the second cycle of a pair of cycles, the punch clutch will latch up after a second cycle of operation.

At 230° CB10 cam contacts close an obvious circuit to the lower gate control magnet 536 which shifts the related lower card stop 433 (Fig. 5) so as to release the card after it has been punched. The punched card enters the last set of continuous running punch feed rolls 422 and 424 at approximately 245° to cause the feeding of the punched card into the chute of the basic sorting machine.

Circuit for energizing dropout coils R21DO to R27DO

After the storage relays R21—R27 have been utilized to select a desired compartment the respective unlatching or dropout magnets are energized during the first part of a cycle to restore their contacts to normal. This circuit extends from line side 591, through contacts 299 (Fig. 15d), and through the following interlock contacts all normally closed, R4a relay contacts, contacts 143, R1b, R31b, R5d relay contacts, CB17 cam contacts, R30c relay contacts now closed, wire 603, cam contacts CB13 to each of the unlatching coils R21DO to R27DO to line side 590. These coils are energized between 2–10° of the first run-in cycle, or in the first of each of the following two cycles of operation, and is effected, therefore, in a cyclic operation of the machine upon a depression of the motor release bar 175.

Sorting compartment selection at the end of the second cycle of the two cycle operations It was explained how the sorting drum 10 was rotated at the end of the run-in cycle, and thereafter two-cycle operations take place when the motor release bar is again depressed. Cam contacts C1 close at 350° of the first of these two cycles to attempt to close, when a different compartment is to be selected after the run-in cycle, a circuit from line side 591, wires 593a, 594a (Fig. 15c), R5c contacts now closed, contacts 118 now closed, to contacts 298 which are now open. It will be recalled that a mechanical latch shown in Fig. 10 holds the motor release bar 175 depressed and contacts 298 are kept opened up to about 352° of the first of these two cycles. Also, since R4 relay is not energized at the end of the first cycle in the two-cycles operation of the machine the clutch magnets 301 will remain energized and the motor release bar 175 will be held depressed by the energized magnets 301 to keep contacts 298 open during the closure of C1 cam contacts between the first and second cycles (see Fig. 14). At the end of the second of the two cycles, when non-repeat R4 relay is energized, as in the basic machine, and as previously described herein for the run-in cycle, the deenergization of magnets 301 and release of the motor release bar 175 enable contacts 298 to close prior to 350° when C1 closes. The circuit is now extended through closed contacts 298, C1 cam contacts, R1b contacts now closed, to reel stop solenoid 115, to line side 590. As described in the section "Card Sorting Mechanism" the drum will be initiated in its rotation at the end of the second of the two cycles of operation. During this rotation of the drum the amount keyboard 160 (Fig. 1) is operated to set up the amount on the card which is now in view at the viewing station.

*Means for feeding punched cards into selected compartment*

The check feeding mechanism of the basic machine is well known and is fully shown and described in the patent to S. Brand et al., No. 2,146,695, and, therefore, the description given herein of this mechanism is only as much as is necessary to understand the changes made in the present machine to feed punched cards to selected sorting compartments. The arrangement is shown in Figs. 11 and 12.

While the sorting drum 10 is being positioned according to the district number sensed on the card the ten-key keyboard mechanism is being operated to set up the amount read on the card. Thereafter, as described, the motor release bar 175 is then depressed to cause two cycles of operation to effect the punching of the card and feeding into the selected compartment.

The punched cards are ejected from the punch by the rollers 422, 424 and are directed by guide plates of a chute 605 (Figs. 3, 4 and 11) into a check receiving chute 604 of the basic machine to the bite of a plurality of pairs of large feed rollers 612 which then feed to the card when rotated to pairs of smaller rollers 613 (Figs. 11 and 12). Feed rollers 612 and 613 normally occupy the position with relation to the chute 604 and sorting drum in which they appear in Fig. 11. In general, the rollers 612 and 613 are carried by frame plates 619 of a pivoted frame which is rocked clockwise during the rotation of these card feeding rollers to feed a punched card into a selected compartment to the position shown in Fig. 12. The pairs of rollers 612 which are in frictional contact are secured to the respective drive shafts 607 and 608, the shafts 607 and 608 being carried by the spaced frame plates 619 which are secured to a rock shaft 620.

Shaft 617, which carries the rearward ones of the smaller feeding rollers 613, is also carried by the side frame plates 619, whereas the shaft 618 which carries the forward ones is carried by arms 616 loosely pivoted on shaft 607 and which are urged by springs (not shown) to bring the associated pairs of feeding rollers 613 together to resiliently seize the punched card fed therebetween.

To rock shaft 620 there is secured a cam follower arm 622 carrying rollers cooperating with a pair of complementary cams 623 secured to the main drive shaft 300, which, it will be remembered receives two complete counterclockwise rotations at each operation of the machine, after a run-in operation. At the proper time in the cycle the cams 623 rock the shaft 620 and the frame plates 619 clockwise to bring the rollers 612 and 613 into close proximity with regard to the selected compartment. At the same time a gear 625 fast on the shaft 300 rotates the rollers 612 and 613 oppositely through the following described train of gears: The gear 625 drives an intermediate gear 626 mounted on a stud 627. The gear 626 meshes with a gear 628 loose on the shaft 620, which gear 628 meshes with a gear 629 fast on the shaft 607. A gear (not shown) but in front of gear 629 also fast to the shaft 607 meshes with a gear 631 fast on the shaft 608. The counterclockwise rotation of the gear 625 through the train of gears 626 and 628 rotates the gear 629, the shaft 607 and the respective feeding rollers 612 fast thereon in a clockwise direction, and also rotates the gear 631 and shaft 608 and the respective feeding rollers 612 on this shaft in a counterclockwise direction. By a suitable gear drive from drive shaft 608 and fully shown and explained in the patent to S. Brand, No. 2,146,695, the feed rollers 613 on the shaft 617 are rotated counterclockwise and the feed rollers 613 on shaft 618 rotated in a clockwise direction, to thus feed the card into the selected compartment.

As the punched cards are fed into the compartment by rollers 613 they are held between a check retainer plate 642 and a series of fingers 643 which are secured to a rod 644 carried by a pair of arms 645. The arms 645 are secured to a rock shaft 646 pivotally supported on brackets 647 (only one of which is shown) secured to a sub-base. Suitable springs (not shown) are provided to normally urge the arms 645 clockwise, pressing rollers 649 carried by the arms 645 against cams 650 fast on the shaft 300.

The fingers 643 are normally in the Fig. 11 position, and when the shaft 300 and consequently the cams 650 are rotated counterclockwise the contour of the cams 650 permits said suitable springs to rock the arms 645 quickly clockwise from the Fig. 11 position to the position in which they appear in Fig. 12 to position the fingers 643 into the compartment. Arms 654 are secured to the shaft 644 and are urged by springs 656 attached to the extensions of fingers 643 to cause the arms 654 to be urged against a guide rod 655 so that as the fingers 643 are moved into the compartment they are guided by the arms 654 cooperating with grooves in said guide rod 655.

When the selected compartment comes into a punched card receiving position an arm 659 comes to rest adjacent a roller 660 carried by an arm 637 which is clamped to rock shaft 620. After the fingers 643 are moved into the compartment, as shown in Fig. 12, the shaft 620 rocks arm 637 to cause roller 660 to rock arm 659. The arm 659 is connected to an arm 662 by a sleeve 663 so as to rock arm 662 counterclockwise against the action of a spring 664. The card retainer plate 642 is pivoted at 665 to said arm 662 and thus shifts the check retainer plate 642 from the position in which it appears in Fig. 11 to the position in which it is shown in Fig. 12. By means of slots 666 in the card retainer plate 642 the latter is moved past the fingers 643 which are now in the compartment so that the incoming card may be fed between the card retainer plate 642 and fingers 643 by the rollers 613 which are now rotating. "Punched Card" in Fig. 12 indicates a punched card fed in a compartment to show how it is fed between the plate 642 and fingers 643.

After the punched card is fed in the compartment between the fingers 643 and the retainer plate 642, the cams 650 restore the arms 645 to their original position withdrawing the fingers 643 from the compartment. The cams 623 then rock the side frames 619 counterclockwise, carrying the feed rollers 612 and 613 outwardly to their normal positions and this allows the spring 664 to carry the retainer plate 642 against the stack of cards to firmly hold the card fed into the compartment against the cards already in the compartment, if they are there.

*Means for detecting a full compartment condition*

Means are provided to detect when any of the card sorting compartments utilized is completely filled. This means includes contacts 670 (Fig. 13a) adapted to be shunted by a toggle operated switch plate 669 when a compartment is full. A cam 671 is fast on the shaft 300 and cooperating with the cam 671 is a roller 672 on the free end of a follower arm 673 of a lever loosely pivoted on the shaft 620. The other arm 674 of the lever is bent over and down in order to clear other mechanism and pivotally carries at 676 a curved lever 677 having one of its arms 678 provided with a block 679 in the plane of a projecting surface 680 on the arm 662.

Figure 13:
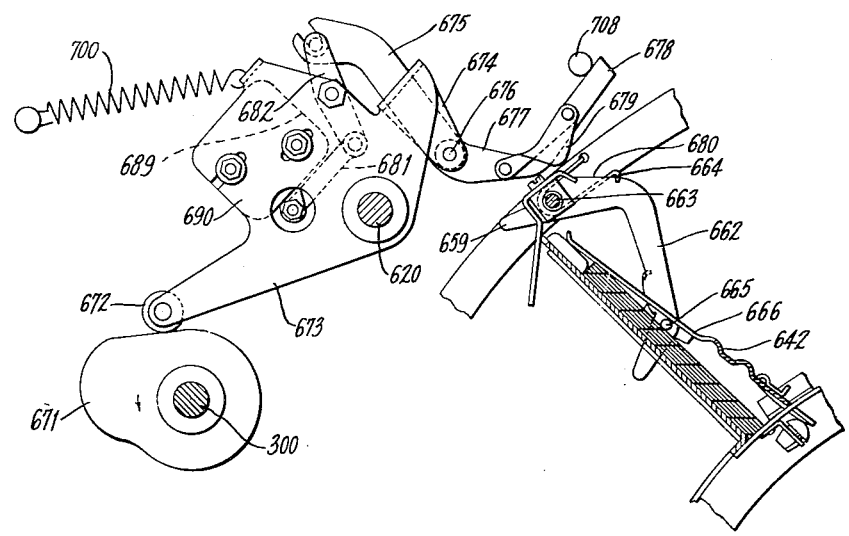
Fig. 13 is a view showing the full pocket sensing and detecting mechanism associated with the card sorting compartment and which in the present invention causes the selection of a successive empty compartment when a preceding compartment has been filled.
Figure 13A:
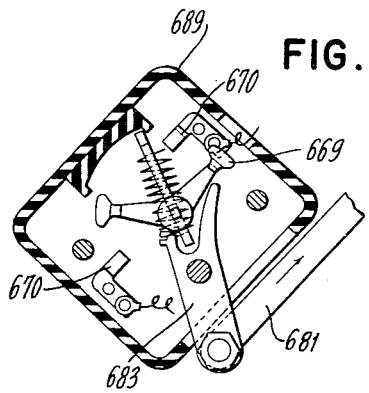
Fig. 13a is a detail view of the full compartment switch.

The other arm 675 of the lever 677 has at its upper end a pin and open slot connection to a double arm 682 which has a link connection 681 to a switch operating arm 683 of a toggle switch of a well known construction. When the toggle switch is operated switch plate 669 is shifted to shunt contacts 670. The details of the switch are shown in Fig. 13a and all parts thereof are mounted in a casing 689 secured to an extension 690 of the lever 673—674.

When the cams 623 (Fig. 11) operate to rock the frames 619 counterclockwise withdrawing the feed rollers 612, and 613 from the position in which they appear in Fig. 12 to their normal position (Fig. 11), springs 664 immediately rock arms 662 clockwise until they are arrested by the plate 642, striking the stack of cards. Shortly thereafter the cam 671 (Fig. 13a) rocks the lever 673—674 clockwise against the action of a connected spring 700 carrying the lever 677 therewith, the lever 677 maintaining the same relation to the arm 674 and with the switch box 689 as shown in Fig. 13.

On its clockwise travel the block 679 will strike the surface 680 if a sufficient number of cards have previously been sorted into the particular compartment selected, and rock the lever 677 slightly counterclockwise about its pivot 676. As the number of cards in the compartment increases the lever 677 will be rocked farther and farther in a counterclockwise direction until eventually when the card capacity of the compartment is reached the movement of the lever 677 is sufficient to rock the lever 682 and shift link 681 to the right so that the toggle action of the switch will cause switch plate 669 to shunt the contacts 670. Upon the restoration of the lever 673—674, due to the previous counterclockwise rocked position of lever 677, the arm 678 of lever 677 will strike a fixed pin 708 and lever 677 will now be rocked clockwise, double arm 682 in the same direction, link 681 to the left, reversing the action of the toggle switch to open contacts 670.

*Operation controlled by full pocket switch 670 when any of the pockets 1 to 12 are filled with punched cards*

As previously described, switch 670 is closed whenever any of the sorting compartments including those numbered 1-12 are filled and when such contacts are closed a circuit is completed at 300° when CB18 cam contacts close, from the line side 591 through R30a contacts now closed (Fig. 15d), switch contacts 670, through R35b and R34b relay contacts now in the normal position shown, CB18 cam contacts to R5 relay coil and also a signal light 705 also in shunt with R5 relay to the line side 590. A holding circuit for R5 relay is established through R5a relay contacts R36c relay contacts to the line side 591. Signal light 705 is in full view of the operator indicating that one of the compartments 1-12 is completely filled with punched cards, and that the operator should remove the cards.

Energization of the R5 relay coil will open R5c relay contacts (Fig. 15c) preventing any change in position of the sorting drum. The R5d relay contacts (Fig. 15d) will open the motor release bar energizing circuit, preventing a cyclic operation of the machine including the card feed and card punching mechanism. The machine is inoperative as to the operation of these parts of the machine until released by the depression of the reset push button 601 (Fig. 15b).

When the sorting compartment is empty the reset push button 601 is depressed to close its contacts and pick up the R36 relay. This will open the R36c relay contacts to deenergize the R5 relay and extinguish the signal light 705.

*Successive selection of sorting compartments 13-22 controlled by switch 670*

In view of the fact that punched cards having the local district designation No. 2 appear in greater number than punched cards bearing other district designations, it is preferable to allocate a plurality of compartments for receiving such cards in succession when the preceding compartment has been filled. This selection mechanism employs a stepping switch which is of a type well known in the telephone art and reference may be had to U. S. patent to Bohlman, No. 1,569,450, which shows and describes a switch of this type in detail. Accordingly, the stepping switch of the present machine is shown only diagrammatically in Fig. 15c. Such switch includes a motor magnet 707 which, upon each energization and deenergization actuates pawl 710 to advance the switch arm 597 step by step over the switch contacts designated 13-22. It is also provided with a release or reset magnet 706 which, when energized, disables a retrograde preventing pawl 709 and the actuating pawl 710 and allows the switch arm 597 to return to normal position under the power of a spring which wound up upon step-by-step advance of the wiper. Such stepping switches are customarily provided with so-called off-normal contacts 711 which are normally open but are closed whenever the switch moves to the 14-22 contact positions.

In the position that switch arm 597 is shown the sensing of the local district designation No. 2 causes the transfer of the R22-1 relay contacts, and the circuit by wire 596 is completed through the switch arm 597 to the No. 13 contact point to wire 43₁₃ to select the No. 13 sorting compartment. Upon each occurrence of a card bearing the No. 2 designation, it is disposed in sorting compartment No. 13 until the full compartment signal switch 670 is closed in the manner previously described. When the circuit is first completed through the switch arm 597 to select the 13 sorting compartment, a supplemental circuit is completed by wire 712 (Fig. 15c) connected to said switch arm to the pickup coil of the R35 relay to the line side 590. A hold circuit for such relay is from the line side 590, through R35H relay coil (Fig. 15b), R35a hold contacts, R6b relay contacts now closed, through punch switch 592 to the line side 591. The holding circuit for R35 is established until the reel changes a position insuring that R35b relay contacts (Fig. 15d) will be in transferred position when a punched card which would cause sorting compartment No. 13 to be completely filled causes closure of contacts 670 to close a circuit as follows: From the line side 591, through R30a relay contacts now closed, full compartment switch contacts 670, R35b relay contacts now transferred, CB19 cam contacts, wire 713 to the motor magnet 707 to the line side 590. This will cause switch 597 to move one step so that it will now rest on the No. 14 contact point. During the successive card sorting operation when District No. 2 designation is sensed, it will cause the completion of the circuit through the No. 14 contact point to thereby select sorting compartment No. 14 for receiving successive cards until it is completely filled. The above described operation will then be repeated, causing the selection of the No. 15 compartment, etc. and then compartments Nos. 16 to 22 in succession.

However, when the last selectable compartment No. 22 is filled a full pocket designation circuit is completed which is described as follows:

*Operation by full pocket switch 670 when sorting compartment No. 22 is completely filled*

For the first and each successive time that the No. 22 sorting compartment is selected due to the position of switch arm 597 on No. 22 contact point, a circuit will be completed to the pickup coil of the R34 relay (Fig. 15c) to the line side 590. R34 closes R34c contacts to complete a circuit from No. 22 switch point, through R34c contacts and a wire connected to No. 22 brush 42 to select compartment No. 22. A holding circuit for the R34H coil is from the line side 590 through R34H (Fig. 15b), R34a contacts, R35c contacts and the aforementioned reset contacts 711, which are now closed since the switch arm 597 is off normal with respect to the 13 contact point, to the line side 591.

Referring now to Fig. 15d the R34 and the R35 relay transfer their respective "b" contacts, thus completing a circuit when compartment No. 22 is filled from the line side 591, through R30a relay contacts, contacts 670, thence through R35b and R34b contacts now transferred, CB18 cam contacts which close at the time contacts 670 close, to the R5 relay coil and signal light 705. As previously described, the latter will give an indication to the operator that No. 22 compartment is now filled and furthermore the machine will be rendered inoperative until the reset button 601 is pushed. As previously described, this will cause the energization of the R36P relay coil and a holding circuit will be then established from the line side 590, through R36H relay coil (Fig. 15b), R36b hold contacts, R34a contacts now closed, R35c contacts now closed, contacts 711 to the line side 591. At the same time a circuit will be completed through R36a relay contacts to the reset magnet 706. Energization of the latter will cause the step-by-step switching distributor to be restored to normal and when switch arm 597 returns to the No. 13 contact point position contacts 711 will open, thereby breaking the holding circuits of R36 and R34 as well as deenergizing the reset magnet 706.

*Clearing out compartments 13 to 22 before they are all filled*

At times it may be necessary to take all the punch cards out of the sorting compartments 13 to 22 before they are filled. In this instance a push button 714 (Fig. 15b) is depressed which, by an obvious circuit, energizes the restoring magnet 706. This will cause the restoration of the step-by-step distributor switch to normal so that sorting of cards bearing the local district designation No. 2 may again be performed, starting at compartment No. 13.

*Sorting of cards in the absence of a designation*

It is obvious that with the present circuit arrangement in the absence of a district numbering designation on a card or the failure to sense a perforation in the column to be sensed, none of the relays R21 to R27 will be energized and the circuit will be extended through their normally closed contacts and by a wire 715 (Fig. 15c) to the No. 2 brush 42, thereby causing the No. 2 compartment to be selected.

While there have been shown and described and pointed out the fundamental novel features of the invention, it will be understood that various omissions and substitutions and changes in the form and details of the device illustrated and in its operation may be made by those skilled in the art, without departing from the spirit of the invention. It is the intention, therefore, to be limited only as indicated by the scope of the following claims:

What is claimed is:

1. In a sorting machine, a plurality of sorting compartments, means for feeding records to selected compartments, record analyzing means, compartment selecting means under control of said record analyzing means for selecting certain compartments in accordance with certain designations on the records, further compartment selecting means for selecting certain other compartments in a predetermined order to thereby cause said certain other compartments to receive all records bearing a certain other designation, means under control of said record analyzing means upon sensing said certain other designation to render said last named selecting means effective for operation, means for sensing when each compartment of said certain other compartments is filled with records, and means controlled by said sensing means to cause said further compartment selecting means to select said certain other compartments in the predetermined order.

2. In a sorting machine, in combination, a plurality of sorting compartments adapted to receive records, record analyzing means, compartment selecting means under control of said record analyzing means for selecting certain compartments when certain designations on the records are analyzed, further compartment selecting means for selecting certain other compartments in a predetermined order and rendered effective when a certain other designation is analyzed to thereby receive all records bearing said certain other designation, means under control of said record analyzing means upon sensing said certain other designation to select and render said last named compartment selecting means effective for operation, and means for causing said further compartment selecting means to select said certain other compartments in the predetermined order.

3. In a record sorting machine, a plurality of sorting compartments adapted to receive records, each having a predetermined capacity, means for selecting certain of said sorting compartments when said records have certain designations, further compartment selecting means to select a plurality of other compartments in a predetermined order as each given pocket becomes filled to capacity with records, sensing mechanism for ascertaining when each compartment of said other compartments becomes filled to capacity with records and to cause said further compartment selecting means to select said plurality of other compartments in said predetermined order, and means for selecting said further compartment selecting means for operation when some of the records bear a common designation, to thereby sort all of said latter records in a plurality of said other compartments.

4. In a record sorting machine, a plurality of sorting compartments adapted to be positioned to receive records, each having a predetermined capacity, means for differentially positioning certain of said sorting compartments to receive records having certain designations, further compartment positioning means to position a plurality of other compartments in a predetermined order as each given pocket becomes filled to capacity with records, sensing mechanism for ascertaining when each compartment of said other compartments becomes filled to capacity with records and for causing said further compartment positioning means to position said plurality of other compartments in said predetermined order, and means for selecting said further compartment positioning means for operation when some of the records bear a common designation, to thereby sort all of said latter records in said plurality of other compartments.

5. In a record sorting machine, a plurality of sorting compartments, compartment selecting means, means controlled by said selecting means for selecting certain compartments for receiving records bearing certain different designations, a step-by-step switch for selecting other compartments in a predetermined order and each in succession as the preceding compartment is full, means for detecting when each of said other compartments becomes full, means controlled by said detecting means upon detecting that one compartment is full for operating said step-by-step switch to select the next compartment in order, and means controlled by said compartment selecting means and operative upon the occurrence of records bearing a certain common designation for rendering said step-by-step switch operative whereby said switch determines the compartments to receive records having said common designations.

6. In a record sorting machine, a plurality of sorting compartments, compartment selecting means, means controlled by said selecting means for selecting certain compartments for receiving records bearing certain different designations, a step-by-step switch for selecting other compartments in a predetermined order and each in succession as the preceding compartment is full, means for detecting when each of said certain compartments and said other compartments become full, means controlled by said detecting means upon detecting that one of said other compartments except the last is full for operating said step-by-step switch to select the next compartment in order, means controlled by said compartment selecting means and operative upon the occurrence of records bearing a certain common designation for rendering said step-by-step switch operative whereby said switch determines the compartments to receive records having said common designations, a device for rendering said compartment selecting means inoperative, and means for causing said detecting means to operate said device when any of said certain compartments are determined to be full, or when the last compartment of said other compartments is full.

7. In a record sorting machine having a rotatable carrier carrying a plurality of record sorting compartments which are allocated to receive in succession records bearing the same designation, means for sensing said records, means under control of said sensing means to effect a rotation of said carrier a predetermined extent to initially select a first compartment, means to direct said records to selected compartments, means for testing and detecting the filled-up condition of each of said sorting compartments, and means under control of said testing means upon detecting a filled-up condition of said first compartment to cause a rotation of said carrier a further predetermined extent to select the next sorting compartment to thereby receive additional records bearing the same designation.

8. In a record sorting machine having a rotatable carrier carrying a plurality of record sorting compartments which are allocated to receive in succession records bearing the same designation, means for sensing the designations on said records, means under control of said sensing means to effect a rotation of said carrier a predetermined extent to initially select a first compartment when the latter is not filled, manually initiated means to feed said records to the selected compartments, means for testing after each feeding operation the number of records therein to detect the filled-up condition of each of said sorting compartments, and means under control of said testing means upon detecting a filled-up condition of said first compartment to cause a rotation of said carrier a further predetermined extent to select the next sorting compartment to thereby receive additional records bearing the same designation.

9. In a record sorting machine having a plurality of record sorting compartments, certain of which are appropriated to receive in succession records bearing the same designation and the remaining compartments to receive and separately sort records bearing other designations, means for sensing the designations on said records for selecting one of said remaining compartments or one of said certain compartments upon sensing said same designation, means for feeding said records to direct said records to the selected compartments, means for testing and detecting the filled-up condition of each of said sorting compartments, means under control of said testing means upon detecting a filled-up condition of each of said certain sorting compartments except the last to select the next compartment to thereby receive the records bearing the same designation in said certain compartments in succession, control means to render the sorting compartment selecting means inoperative, and means under control of said testing means upon detecting a filled-up condition of each of said remaining sorting compartments to render said control means operative, and upon detecting a filled-up condition of said last sorting compartment to also render said control means operative.

10. In a record sorting machine having a rotatable carrier carrying a plurality of record sorting compartments, certain of which are appropriated to receive in succession records bearing the same designation and remaining compartments to receive and sort records bearing other designations, means for sensing the designations on said records, sorting compartment selecting mechanism under control of said sensing means to effect a predetermined rotation of said carrier to position a selected compartment at a common record receiving position, means located at said common record receiving position for testing and detecting the filled-up condition of each of said sorting compartments, means under control of said testing means upon detecting a filled-up condition of each of said certain compartments except the last to cause a further rotation of said carrier which selects the next one of said certain sorting compartments to receive additional records also bearing the same designation, control means to render the sorting compartment selecting mechanism inoperative, and means under control of said testing means upon detecting a filled-up condition of the last one of said certain compartments to render said control means operative.

11. In a record sorting machine having a plurality of record sorting compartments, certain of which are appropriated to receive in succession records bearing the same designation and remaining compartments to receive and sort records bearing other designations, means for sensing said records, sorting compartment selecting mechanism under control of said sensing means for selecting said compartments, means to direct said records to selected compartments, means common to all of said compartments for testing and detecting the filled-up condition of each of said sorting compartments, means under control of said testing means upon detecting a filled-up condition of each of said certain compartments except the last to select the next one of certain sorting compartments to receive additional records also bearing the same designation, control means to render the sorting compartment selecting mechanism inoperative, and means under control of said testing means upon detecting a filled-up condition of the last of said certain compartments to render said control means operative.

References Cited in the file of this patent
UNITED STATES PATENTS

| | | |
|---|---|---|
| 2,000,214 | Campbell | May 7, 1935 |
| 2,142,352 | Fuller et al. | Jan. 3, 1939 |
| 2,161,612 | Brand | June 6, 1939 |